US009892813B1

(12) United States Patent
Barkow

(10) Patent No.: US 9,892,813 B1
(45) Date of Patent: Feb. 13, 2018

(54) GRAPHENE/METAL MOLECULAR LEVEL LAMINATION (GMMLL)

(71) Applicant: Thomas A. Barkow, Duncanville, TX (US)

(72) Inventor: Thomas A. Barkow, Duncanville, TX (US)

( * ) Notice: Subject to any disclaimer, the term of this patent is extended or adjusted under 35 U.S.C. 154(b) by 1055 days.

(21) Appl. No.: 13/865,818

(22) Filed: Apr. 18, 2013

Related U.S. Application Data

(60) Provisional application No. 61/635,468, filed on Apr. 19, 2012.

(51) Int. Cl.
*B32B 9/00* (2006.01)
*H01B 1/04* (2006.01)
*H01B 13/30* (2006.01)

(52) U.S. Cl.
CPC ............... *H01B 1/04* (2013.01); *H01B 13/30* (2013.01); *Y10T 428/30* (2015.01)

(58) Field of Classification Search
CPC C01B 31/0438; C01B 2204/00; Y10T 428/30
USPC .......................................... 428/408; 423/448
See application file for complete search history.

(56) References Cited

U.S. PATENT DOCUMENTS 3,616,290 A * 10/1971 Toledo .................. C25D 3/562 205/138
2011/0189406 A1* 8/2011 Cho ........................ C23C 14/48 427/523
2012/0006580 A1* 1/2012 Sandhu ............. H01L 23/53238 174/126.1
2013/0095389 A1* 4/2013 Bhardwaj ............ H01M 4/663 429/322

OTHER PUBLICATIONS

Zhang (Comparison of Graphene on single crystalline and polycrystalline Ni by Chemical Vapor Deposition) J. Phys. Chem. Lett, 2010, 3101-3107.*
Albano, R.R.S.a.V.J., Preparation of High-Purity Nickel II. Zone Melting. J. Electrochem. Soc., Jul. 1968. 115(7).
Andrade, E. N. DA, C.A., F.R.S., and R. Roscoe, Glide in metal single crystals. Proc. Phys. Soc, Jan. 22, 1937. 49.
Andrade, E.N.d.C., Preparation of Single Crystal Wires of Metals of High Melting Point. Proceedings of the Royal Society of London. Series A, Mathematical and PhysicalSciences, 1937. 163(912): p. 16-18; Jan. 11, 1937.
Aust, K.T., Principals of Crystal Growth from the Solid State in Relation to the Preparation of Large Crystals. Journal of Crystal Growth, Mar. 1972. 13/14: p. 57-61.
Betz, Gerhard, K.W., Energy and angular distributions of sputtered particles. Internation Journal of Mass Spectroscopy and Ion Processing, Aug. 1994. 140.

(Continued)

*Primary Examiner* — Daniel H Miller
(74) *Attorney, Agent, or Firm* — CARR Law Firm PLLC

(57) ABSTRACT

A laminated metal consisting of any metallic or semi-metallic base material onto which alternate layers of monocrystalline nickel and monolayer graphene are deposited. The base material can be any metal, such as alloys of steel, copper, aluminum, nickel, palladium, cobalt, platinum, or silicon. The finished material will have one or more layers of nickel/graphene on its surface. In the case of wire, the layers are coaxial to the core material.

17 Claims, 15 Drawing Sheets

GMMLL WIRE

(56) References Cited

OTHER PUBLICATIONS

Blakely, J.C.H.a.J.M., Carbon Segregation to Single Crystal Surfaces of Pt, Pd, and Co. Surface Science, Aug. 1979. 91: p. 199-217.
Blakely, L.C.I.a.J.M., Segregation isosteres for carbon at the (100) surface of nickel. Surface Science, Mar. 1976. 58: p. 397-414.
Blakely, M.E.a.J.M., Carbon Interaction with Nickle Surfaces: Monolayer Formation and Structural Stability. Journal of Chemical Physics, Oct. 1979. 71(8): p. 3467-3477.
Blakely, M.E.a.J.M., Carbon Monolayer Phase Condensation on Ni(111). Surface Science, Nov. 1978. 82: p. 228-236.
Castro Neto, A. H., V.N.K., and Vitor M. Pereira, Johan Nilsson, N. M. R. Peres, Bruno Uchoa, Adatoms in graphene. Solid State Communications, Jan. 2009. 149.
Chen, R.T.Y.a.J.P., Mechanism of Carbon Filament Growth on Metal Catalysts. Journal of Catalysis, Mar. 1989. 115: p. 52-64.
Dreyer, Daniel R., R.S.R., and Bielawski, Christopher W.; From Conception to Realization: An Historical Account of Graphene and Some Prospectives for Its Futures. Angewandte Chemie, Nov. 2010. 49: p. 9336-9344.
Geim, A.K., Graphene: Status and Prospects. Science, Jun. 19, 2009. 324: p. 1530-1534.
Khan, M. R. I.K.S., d Falco, CH. M.; Sputtering Epitaxy of Ag and Ni films. phys. stat. sol. (a), May 1982. 73.
Li et al.; Synthesis, Characterization, and Properties of Large-Area Graphene Films; ECS Transactions, 19 (5) 41-52 (2009) 10.1149/1.3119526 © The Electrochemical Society; Dec. 2009.
Li, Xuesong, C.W.M., Archana Venugopal, Rudolf M. Tromp, James B. Hannon, Eric M. Vogel, Luigi Colombo, and Rodney S. Ruoff, Large-Area Graphene Single Crystals Grown by Low-Pressure Chemical Vapor Deposition of Methane on Copper. Journal of the American Chemical Society, Feb. 2011. 113: p. 2816-2819.
Li, Xuesong, W.C., Luigi Colombo, and Rodney S. Ruof Evolution of Graphene Growth on Ni and Cu by Carbon Isotope Labeling. Nanoletters, Aug. 2009. 9(12): p. 4268-4272.
Meyer, Kevin I.K.S., and Falco, Charles M.; Thermalization of sputtered atoms. J. Appl. Phys, May 1981. 52.
Muller, K.-H., Role of incident kinetic energy of adatoms in thin film growth. Surface Science, Feb. 1987. 184: p. L375-L382.
Novoselov, A.K.G.a.K.S., The Rise of Graphene. Nature Materials, Mar. 2007. 6: p. 183-191.
Oechsner, H., Sputtering—a Review of Some Recent Experimental and Theoretical Aspects. Appl. Phys., Aug. 1975. 8: p. 185-198.
Pamplin, B.R., The Evolution of Crystal Growth Techniques. Prog. Crystal Growth Charact, Jan. 1977. 1: p. 5-22.
Park et al.; Fabrication of Graphene Thin Films Based on Layer-by-Layer Self-Assembly of Functionalized Graphene Nanosheets; ACS Appl. Mater. Interfaces 2011, 3, 360-368; Jan. 5, 2011.
Ruoff, R. S.; Graphene Materials and Opportunities; presentation slide show, Univ. of Texas at Austin; May 2011.
Ruoff, R.; Calling All Chemists; nature nanotechnology, vol. 3, Jan. 2008, pp. 10-11; www.nature.com/naturenanotechnology.
Shelton, J. C., H.R.P., and Blakely, J. M.; Equilibrium Segregation of Carbon to a Nickel (111) Surface: A Surface Phase Transition. Surface Science, Jan. 1973. 43: p. 493-520.
Somekh, R.E. C.S.B.; Sputter deposition of single crystal metal multilayers. Journal of Crystal Growth, Dec. 1986. 76: p. 119-125.
Somekh, R.E.; Calculations of thermalization during the sputter deposition process. Vacuum, Dec. 1984. 34(10/11): p. 987-990.
Thornton, J.A.; High Rate Thick Film Growth. Ann. Rev. Mater. Sci., Dec. 1977. 7: p. 239-260.
Unarunotai et al.; Conjugated Carbon Monolayer Membranes: Methods for Synthesis and Integration; Adv. Mater. 2010, 22, 1072-1077; Feb. 1, 2010.
Wang, Rui Y.H., Wang, Ziqian, Hao Gong, and John T. L. Thong; Large-Diameter Graphene Nanotubes Synthesized Using Ni Nanowire Templates. Nanoletters, Oct. 2010. 10: p. 4844-4850.
Wehner, R.V.S.a.G.K.; Energy Distribution of Sputtered Cu Atoms. J. Appl. Phys, Jun. 1964. 35.
Wendt, S.-B.W.a.A.E.; Control of ion energy distribution at substrates during plasma processing. Journal of Applied Physics, Jul. 2000. 88(2).
Yang, Y. G., R.A.J.a.H.N.G.W.; A Monte Carlo Simulation of the Physical Vapor Deoposition of Nickel. Acta. Mater, Jan. 1997. 4: p. 1455-1468.
Zhou, X. W., R.A.J.a.H.N.G.W.; A Molecular Dynamics Study of Nickel Vapor Deposition—Temperature—Incident Angle and Adatom energy effects. Acta. Mater, Aug. 1996. 45(4): p. 1513-1524.
Zhu, Yanwu, S.M., Weiwei Cai, Xuesong Li, Ji Won Suk, Jeffrey R. Potts, and Rodney S. Ruoff, Graphene and Graphene Oxide: Synthesis, Properties, and Applications. Advanced Materials, May 2010. 22: p. 3906-3924.
Abergel, D.S.L. et al.; "Properties of Graphene: A Theoretical Perspective"; Advances in Physics; Mar. 1, 2010.
An, Jinho et al.; Domain (Grain) Boundaries and Evidence of "Twinlike" Dtructures in Chemically Vapor Deposited Grown Graphene; ACSNANO vol. 5 No. 4 2433-2439; American Chemical Society; Mar. 1, 2011.
Bo, Z. et al.; "Nanoscale Discharge Electrode for Minimizing Ozone Emission from Indoor Corona Devices";Environ. Sci. Technol. 2010, 44, 6337-6342; American Chemical Society; Jul. 2, 2010.
Bo, Z. et al.; "Vertically oriented graphene sheets grown on metallic wires for greener corona discharges: lower power consumption and minimized ozone emission"; Energy Environ. Sci., 2011, 4, 2525, The Royal Society of Chemistry; May 19, 2011.
Castro Neto, A.H. et al.: "The electronic properties of graphene"; Reviews of Modern Physics, vol. 81, Jan.-Mar. 2009; The American Physical Society; Jan. 14, 2009.
Castro Neto, et al.; The Electronic Properties of Graphene; Jan. 16, 2009.
Chapman, G.E.; "The Energy Distribution of Sputtered Atoms From Gold"; Radiation Effects 1972, vol. 13, pp. 121-129; Gordon amd Breach, Science Publishers Ltd, Glascow, Scotland; Jul. 1971.
Dato, A. et al.; "Substrate-Free Gas-Phase Synthesis of Graphene Sheets"; Nano Letters, vol. 8, No.&(2008) 2012-2013; American Chemical Society; Jun. 5, 2008.
Davy, D.; "Nickel Vaport Deposition Technology"; Rapid Tooling: Technologies and Industrial Applicaiotns. New York, NY; Jan. 2000.
Ferrari, A.C. et al,; Raman Spectrum of Graphene and Graphene Layers; PRL 97, 187401 (2006); The American Physical Society; Nov. 3, 2006.
Flamm, Dan.L. et al; "Basic Chemistry and Mechanisms of Plasma Etching"; J. Vac. Sci. Technol. B 1 (1), Jan.-Mar. 1983; American Vacuum Society; Jan. 1983.
Frederick, P.S. & Hruska, S.J.; Aes Study of Nickel Carburization: Electron Beam-Induced Effects; North-Holland Publishing Co.; Nov. 23, 1976.
Fuechsle, M. et al.; "A Single-Atom Transistor"; Nature Nanotechnology, DOI: 1038/NNANO.2012.21; Feb. 19, 2012.
Kelly, P.J. et al.; "Magnetron Sputtering: A Review of Recent Developments and Applications"; Vacuum 56 (2000) 159-172, Jan. 2000.
Lander, J.J. et al.; Solubility and Diffusion Coefficient of Carbon in Nickel: Reaction Rates of NickelCarbon Alloys with Barium Oxide; Appl. Phys. 23, 1305 (1952); Dec. 1952.
Li, Xuesong et al.; "Evolution of Graphene Growth of Ni and Cu by Carbon Isotope Labeling"; Nano Letter vol. 9, No. 12(2009) pp. 4268-4272; Aug. 27, 2009.
Li, Xuesong, et al.; Large-Area Synthesis of High-Quality and Uniform Graphene Films on Copper Foils; Science 324, 1312; Jun. 5, 2009.
Loh, K.P. et al.; "The chemistry of graphene"; J. Mater. Chem., 2010, 20, 2277-2289; The Royal Society of Chemistry; Jan. 6, 2010.
Massaro, T.A. et al.; "Bulk Diffusion of Carbon-14 through Poly crystalline Nickel Foil between 350 and 700 C"; J. Appl. Phys. 42, 5534 (1971), American Institute of Physics; Dec. 1971.
Mattox, D.W.; "Particle Bombardment Effects on Thin-Film Deposition: A Review"; J. Vac. Sci. Technol. A 7 (3), May/Jun. 1989; American Vacuum Society; May 1989.

(56) References Cited

OTHER PUBLICATIONS

Nagashio, K. et al.; "Contact resistivity and current flow path at metal/graphene contact"; Applied Physics Letters 97, 143514 2010; American Institute of Physics; Oct. 8, 2010.
Nilsson, J. et al.: "Electronic Properties of Graphene Multilayers"; PRL 97, 266801 (2006), The American Physical Society; Dec. 31, 2006.
Novoselov, K.S. et al.; Room-Temperature Quantum Hall Effect in Graphene; Science vol. 315 Mar. 9, 2007 p. 1379; Feb. 15, 2007.
Obraztov, Alexander N.; Making Graphene on a Large Scale; Nature Nanotechnology, vol. 4, Macmillan Publishers Limited; Apr. 2009.
Peres, N.M.R.; "Colloquium: The transport properties of graphene: An introduction"; Reviews of Modern Physics, vol. 82, Jul.-Sep. 2010; The American Physical Society; Sep. 15, 2010.
Randahawa, H.; "Review of Plasma-Assisted Deposition Processes"; Thin solid Films, 196(1991) 329-349; Apr. 2, 1990.
Reina, Alfonso et al.; Large Area, Few-Layer Graphene Films on Arbitrary Substrates by Chemical Vapor Deposition; Nano Letters, vol. 9, No. 1, 30-35; American Chemical Society; Dec. 1, 2008.
Rosinger, H.E. et al.; Growth of Cylindrical Iron Single Crystals by the Strain-Anneal Technique; Journal of Crystal Growth 7 (1970) 42-44; North-Holland Publishing Co.; Jan. 13, 1970.
Royal Swedish Academy of Sciences; "Scientific Background on the Nobel Prize in Physics 2010—Graphene"; Oct. 5, 2010.
Ruoff, R.; "Graphene Materials" presentation slides; The University of Texas at Austin; Oct. 2010.
Salto, R. et al.; "Electronic structure of chiral graphene tubules"; Appl. Phys. Lett. 60 (18) 2204-2206, American Institute of Physics; May 4, 1992.
Salto, R. et al.; "Electronic structure of double-layer graphene tubules"; J. Appl. Phys. 73 (2) 494-500, American Institute of Physics; Jan. 15, 1993.
Sigmund, Peter; "Theory of Sputtering. I. Sputtering Yield of Amorphous and Poly Crystalline Targets"; Physical Review, vol. 184, No. 2; Aug. 10, 1969.
Somekh, R.E. et al.; "UHV Sputter Depostion With a Research-Scale DC Magnetron"; 1988 J. Phys. E: Sci. Instrum. 21 (1988) 1029-1033; Jun. 23, 1988.
Terrones, M.; "Science and Technology of the Twenty-First Century: Synthesis, Properties, and Applications of Carbon Nanotubes"; Annu. Rev. Mater.Res. 2003. 33:419-501, Annual Reviews; Jan. 2003.
Thompson, M.W.; "The Energy Spectrum of Ejected Atoms During the High EB=Nergy Sputtering of Gold"; Philosophical Magazine, vol. 18, #152(1968) pp. 377-414; Mar. 2, 1968.
Thornton, J.A.; "Magenetron Sputtering: Basic Physics and Application to Cylindrical Magnetrons"; J. Vac. Sci. Technol. 15(2) Mar./Apr. 1978; American Vacuum Society; Mar. 1978.
Thornton, J.A.; "Plasma-Assisted Depostion Processes: Theory, Mechanisms and Applications"; Thin Solid Films, 107(1983)3-19; Apr. 18, 1983.
Thornton, J.A.; "The Microstructure of Sputter-Deposited Coatings"; J. Vac. Sci. Technol. vol. 4, No. 6(1986), pp. 3059-3065; Jun. 6, 1986.
Williams, Peter; "The Sputtering Process and Sputtered Ion Emission"; Surface Science 90 (1979) 588634, North Holland Publishing Co.; Jul. 31, 1979.
Wintterlin, J. et al.; "Graphene on metal surfaces"; Surface Science 603 (2009) 1841-1852; Jan. 14, 2009.
Yang, S. et al.; "Correlation Between Geometry and Nanobubble Distribution on HOPG Surface"; EPL, 81 (2008) 64006; ELPA; Mar. 2008.
Yu, Quingkai, et al.; Graphene Segregated on Ni Surfaces and Transferred to Insulators; Applied Physics Letters 93, 113103 2008; American Institute of Physics; Sep. 15, 2008.
Novoselov, K.S. et al.: Two-Dimensional Gas of Massless Dirac Fermions in Graphene.

* cited by examiner

*FIG. 6*
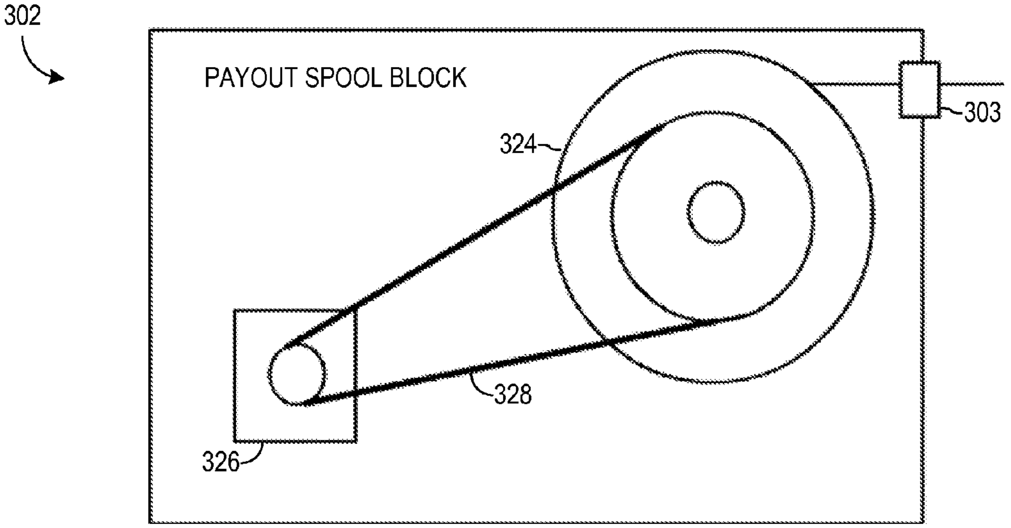
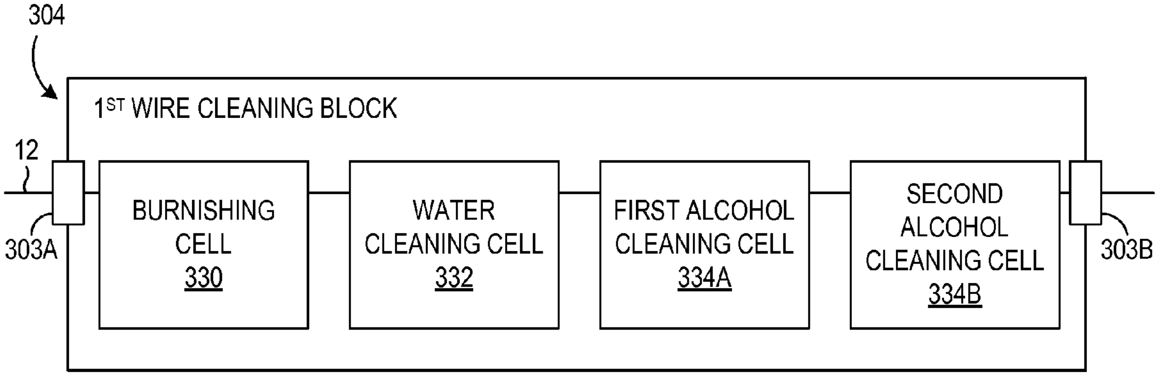
*FIG. 7*

*FIG. 10*
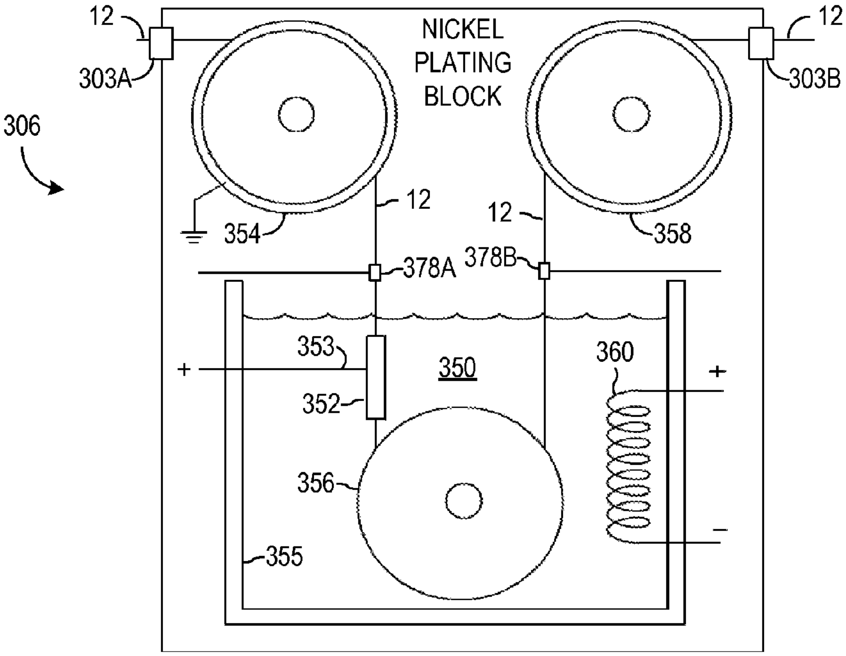
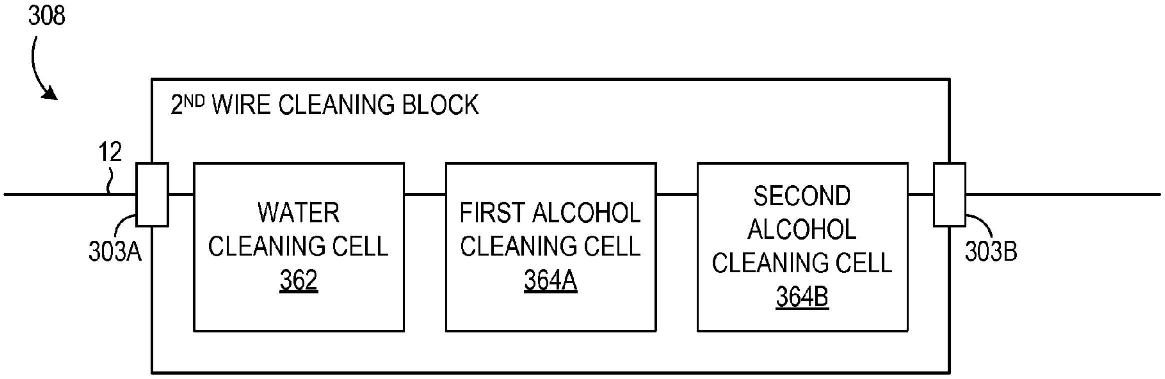
*FIG. 11*

TEMPERATURE PROFILE
NICKEL CRYSTALLIZING BLOCK 310

ELECTRICAL EQUIVALENT
NICKEL CRYSTALLIZING BLOCK 310

*FIG. 17*
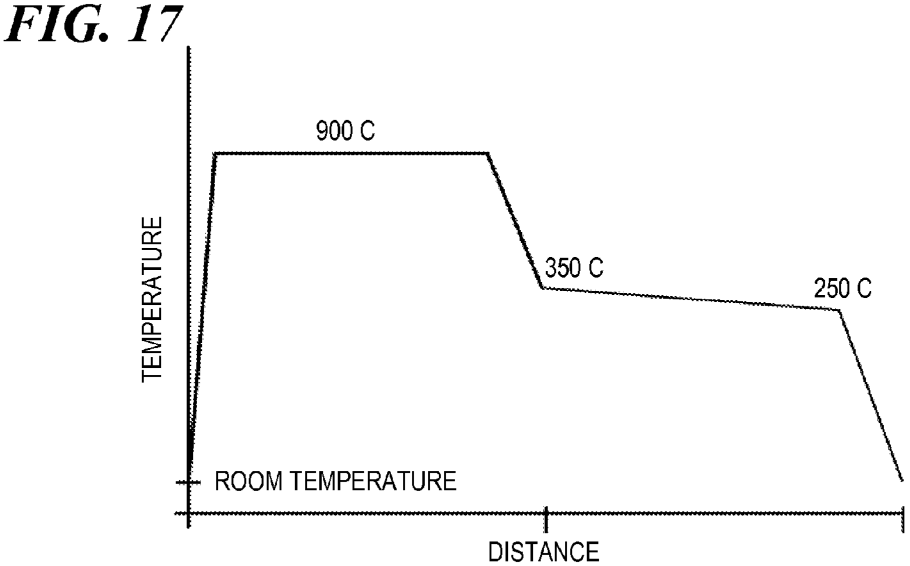
TEMPERATURE PROFILE
CARBON ABSORPTION BLOCK
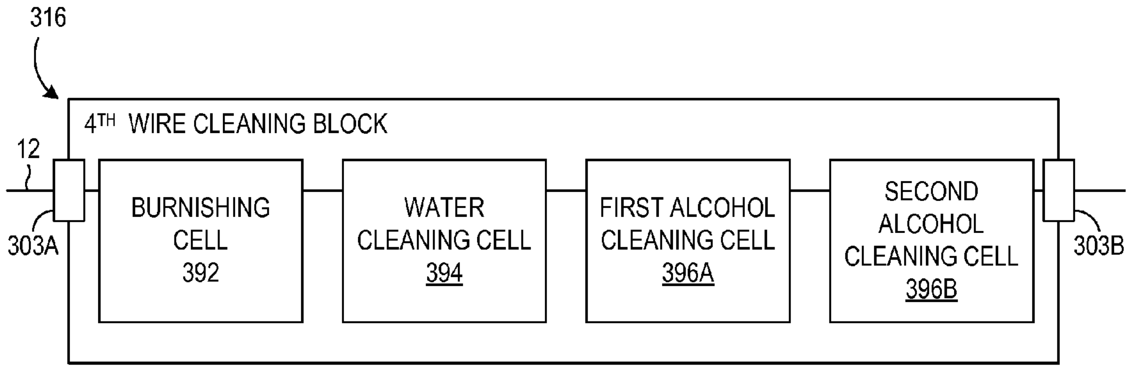
*FIG. 18*

GMMLL WIRE

GMMLL RIBBON

GRAPHENE/METAL MOLECULAR LEVEL LAMINATION (GMMLL)

CROSS-REFERENCE TO RELATED APPLICATIONS

This application relates to U.S. provisional patent application Ser. No. 61/622,993 entitled GRAPHENE/METAL MOLECULAR LEVEL LAMINATION (GMMLL) AND SELF ASSEMBLY OF SINGLE LAYER GRAPHENE, filed Apr. 11, 2012, relates to and claims the benefit of the filing date of, U.S. provisional patent application Ser. No. 61/635,468 entitled GRAPHENE/METAL MOLECULAR LEVEL LAMINATION (GMMLL) AND SELF ASSEMBLY OF SINGLE LAYER GRAPHENE, filed Apr. 19, 2012, the entire contents of which are incorporated herein by reference for all purposes.

TECHNICAL FIELD

The present invention relates to laminated metals and, more particularly, to electrically conductive metals having layers of nickel and grapheme laminated to the surface of the conductive metal.

BACKGROUND OF THE INVENTION

Graphene is a substance composed of pure carbon, with atoms arranged in a regular hexagonal pattern similar to graphite, but in a sheet or layer only one-atom thick. Graphene is known to have high electrical conductivity at room temperature. Graphene is also known to have high mechanical strength.

SUMMARY OF THE INVENTION

The present invention provides a laminated metal consisting of any metallic or semi-metallic base material onto which alternate layers of monocrystalline nickel and monolayer graphene are deposited. The base material can be any metal, such as alloys of steel, copper, aluminum, nickel, palladium, cobalt, platinum, or silicon. The finished material may have one or more layers of nickel/graphene on its surface. In the case of wire, the layers are coaxial to the core material. Multiple layers of monolayer graphene separated by a layer of monocrystalline nickel may be produced in batch or continuous processes, including enhancement of the monolayer graphene by use of a shape drawing technique.

BRIEF DESCRIPTION OF THE DRAWINGS

For a more complete understanding of the present invention and the advantages thereof, reference is now made to the following Detailed Description taken in conjunction with the accompanying drawings, in which:

FIG. 6 is a schematic representation of a payout spool process block;

FIG. 7 is a schematic representation of a first wire cleaning process block;

FIG. 10 is a schematic representation of a nickel plating process block;

FIG. 11 is a schematic representation of a second wire cleaning process block;

FIG. 17 illustrates a temperature profile within the carbon absorption process block;

FIG. 18 is a schematic representation of a fourth wire cleaning process block;

DETAILED DESCRIPTION

In the following discussion, numerous specific details are set forth to provide a thorough understanding of the present invention. However, those skilled in the art will appreciate that the present invention may be practiced without certain specific details. In other instances, well-known elements have been illustrated in schematic or block diagram form in order not to obscure the present invention with unnecessary detail. Additionally, for the most part, certain specific details, and the like have been omitted inasmuch as such details are not considered necessary to obtain a complete understanding of the present invention, and are considered to be within the understanding of persons of ordinary skill in the relevant art.

A Graphene/Metal Molecular Level Lamination (GMMLL) may be a laminated metal consisting of any metallic base material onto which alternate layers of monocrystalline nickel and monolayer graphene are deposited. The base material can be any electrically conductive metal, such as alloys of steel, copper, aluminum, nickel, palladium, cobalt, platinum, or the base material may be semi-conductive material, such as silicon. The finished material may have one or more layers of nickel and graphene on its surface. If the base material is in the form of a wire, the layers of nickel and graphene may be coaxial to the base material forming the core of the finished wire. A GMMLL material is a new type of composite material which may have multiple layers of monolayer graphene separated by a layer of monocrystalline nickel, and may be characterized by lower electrical resistivity, higher strength, higher heat transfer, and higher corrosion resistance than conventional electrically-conductive materials.

Figure 1:
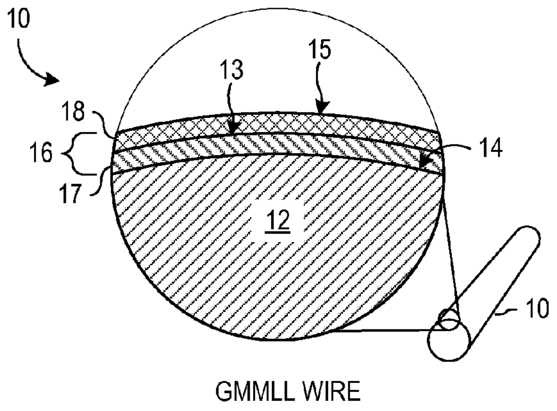
FIG. 1 illustrates wire having a multi-layer coating according to an aspect of the invention.

Turning now to FIG. 1, a GMMLL wire 10 may have a core wire 12 comprising a metallic base material having a surface 14. A first lamination 16 may be a first layer of monocrystalline nickel 17 deposited on the surface 14 of wire core 12, and a first layer of graphene 18 deposited over the layer of monocrystalline nickel 17. The first layer of monocrystalline nickel 17 may have a surface 13, and the first layer of graphene 18 may have a surface 15. Subsequent laminations may also be applied in alternating layers of nickel and graphene, as will be described hereinafter. The first lamination 16, and any subsequent laminations, is preferably coaxial with the core 12 of GMMLL wire 10.

Figure 2:
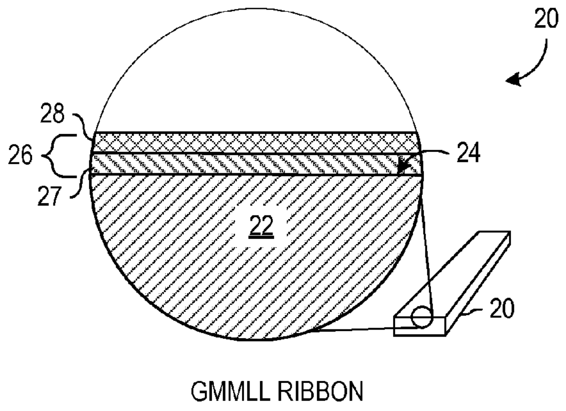
FIG. 2 illustrates a ribbon having a multi-layer coating according to an aspect of the invention

Turning now to FIG. 2, a GMMLL ribbon 20 may have a substrate 22 comprising a metallic base material having surfaces 24. A first lamination 26 may be a layer of monocrystalline nickel 27 deposited on the surface 24 of ribbon substrate 22, and a layer of graphene 28 deposited over the layer of monocrystalline nickel 27. Subsequent laminations may also be applied in alternating layers of graphene and nickel, as will be described hereinafter. The first lamination 26 and any subsequent laminations are preferably deposited on all exterior surfaces 24 of the substrate 22 of GMMLL ribbon 20. Alternatively, the laminations may be deposited on only one or more surfaces 24 of ribbon substrate 22.

A GMMLL wire 10, or a GMMLL ribbon 20, may be fabricated in a continuous process or in a batch process. A GMMLL product, such as a GMMLL wire 10 or a GMMLL ribbon 20, may have a cross section of any shape, such as a circular cross section in the case of a wire, a rectangular cross section in the case of a ribbon, or any other cross sectional shape. A GMMLL product may also be characterized by alternating layers of graphene and nickel deposited on a surface of a semi conductive material, such as silicon and the like. The following description describes a process for fabricating a GMMLL wire 10, having a circular cross section, but the process described hereinafter should be understood to apply as well to the fabrication of a GMMLL ribbon 20, having a rectangular cross section, or any other similarly elongated form having a particular cross sectional shape other than circular or rectangular.

Continuous Production Process

Figure 3:
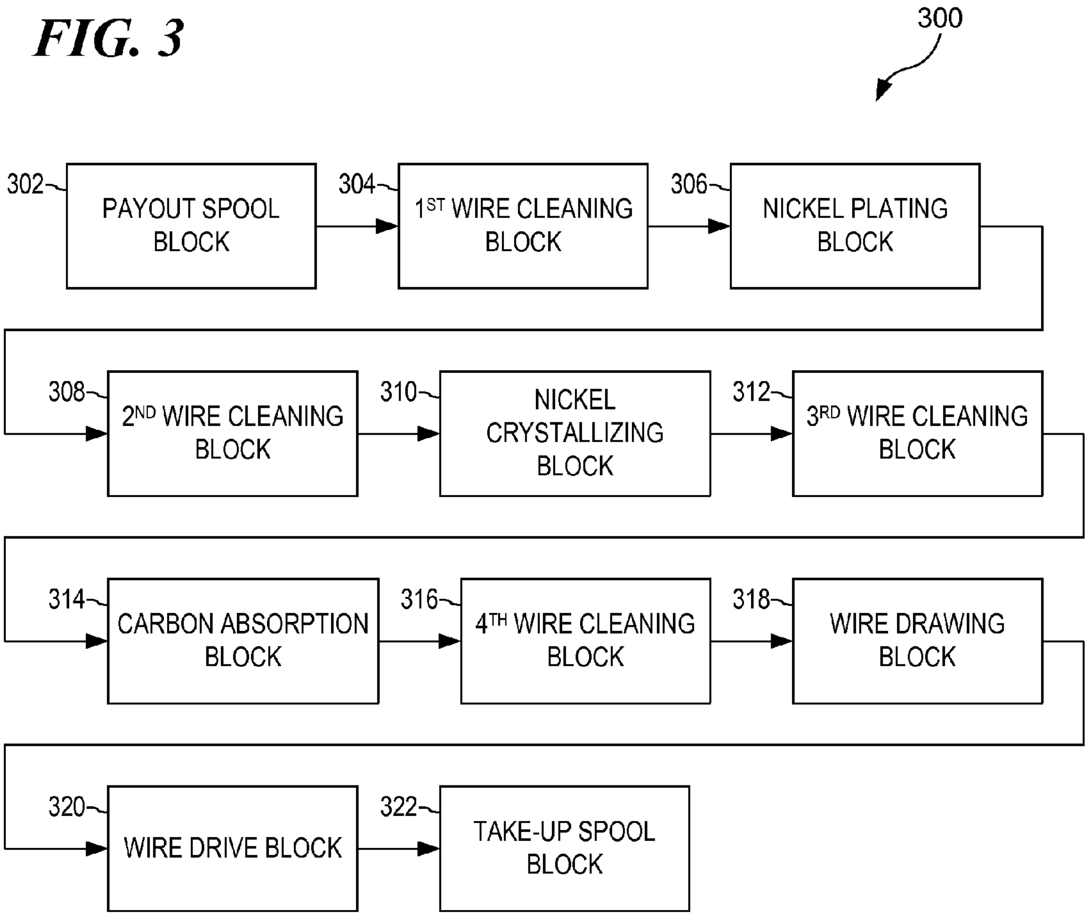
FIG. 3 is a block diagram of an apparatus for producing a wire or ribbon having a multi-layer coating, according to an aspect of the invention.

A continuous process for fabricating a GMMLL material, such as a GMMLL wire 10, may include a number of process blocks for performing the steps of the continuous process. Each process block may be a vacuum-grade enclosure 30 in which at least one of the various processes relating to continuous production of a GMMLL product may take place. Turning now to FIG. 3, there is illustrated a typical process 300 for producing a GMMLL wire 10 having a single layer of monocrystalline nickel and a single layer of graphene. The process 300 may comprise the following steps, each step being performed by a dedicated process block to be described in more detail hereinafter.

The process 300 may begin by loading the wire base material onto a payout spool 302 for holding the unprocessed wire and feeding the unprocessed wire into the subsequent process blocks while maintaining a constant tension of the wire. The unprocessed wire moves firstly into a first wire cleaning block 304 for removing oxides, dirt, grease, and other impurities from the surface of the wire. The wire moves next into a nickel plating block 306 for electroplating pure nickel onto the moving wire. The wire moves next into a second wire cleaning block 308 for cleaning the partially-processed wire with water and isopropyl alcohol. The wire moves next into a nickel crystallizing block 310 for changing the nickel electroplate to monocrystalline nickel. The wire moves next into a third wire cleaning block 312 for removing an oxide layer from the surface of the monocrystalline nickel. The wire moves next into a carbon absorption block 314 for depositing carbon onto the layer of monocrystalline nickel, forming a layer of graphene. The wire moves next into a fourth wire cleaning block 316 for removing carbon soot from the surface of the partially-processed wire. The wire moves next into a wire drawing block 318 for reducing the diameter of the partially-processed wire and for smoothing any multiple layers of graphene into a single layer of graphene. The wire moves next into a wire drive block 320 for pulling the wire through the previous process blocks and for maintaining an even tension on the wire throughout the process. Finally, the wire is taken up in a take-up spool block 322 for winding the processed wire onto a take-up spool.

Simply stated, the multistep process 300 takes a base metal wire, electroplates it with nickel, changes the nickel to monocrystalline nickel, dopes the nickel with carbon, and allows monolayer graphene to form on the surface of the nickel. The wire is then drawn to reduce its diameter slightly and to maximize the monolayer graphene. The formation of graphene is highly dependent on the cleanliness and uniformity of the wire surface, the purity of gas atmospheres within each of the process blocks, and the accuracy of controls on all process parameters. For a continuous process with the wire travelling at a fixed speed, lengths of the process blocks may be adjusted to create the necessary dwell times of the wire in each process block. The process blocks will now be described in greater detail.

Process Block 301 and Wire Seal 303

Figure 4:
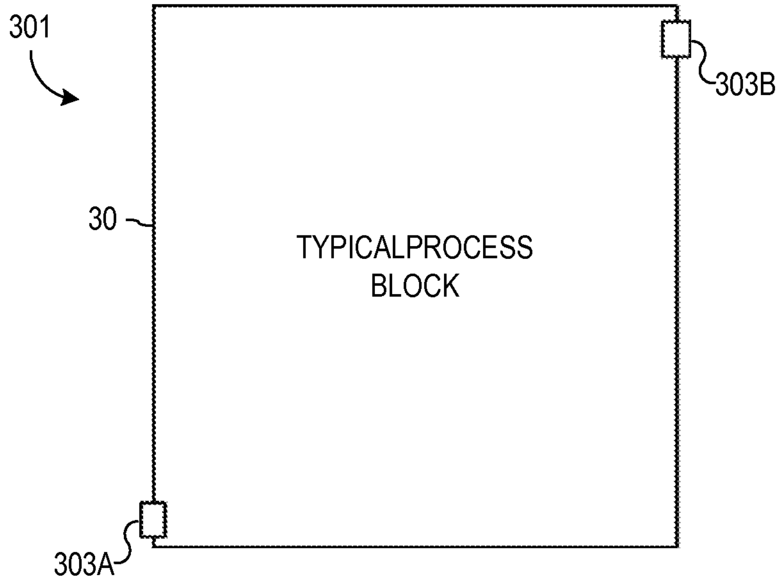
FIG. 4 is a schematic representation of a typical process block, according to an aspect of the invention.

Turning now to FIG. 4, a typical process block 301 may be a vacuum grade enclosure 30 in which one or more processes relating to the continuous production of GMMLL take place. Wire may travel into a process block through a first wire seal 303A and may exit a process block through a second wire seal 303B. For convenience, each set of first and second wire seals for any given process block will be referred to as first wire seal 303A and second wire seal 303B, respectively, although it should be understood that each individual process block may be equipped with its own set of first and second wire seals 303A and 303B. The typical process block 301 serves to isolate each of the various processes utilized for continuous production, maintain the required atmosphere for each process, and keep contaminates off the wire during each process. Each process block 301 can be individually evacuated and backfilled with any gas. Each process block 301 may be cooled to maintain a stable temperature, and may be electrically insulated from adjoining process blocks. The wire travelling through any process block may be electrically insulated from the process block. Before production begins, all process blocks are preferably evacuated and backfilled to at least 1 atmosphere, or greater, with argon gas.

Figure 5:
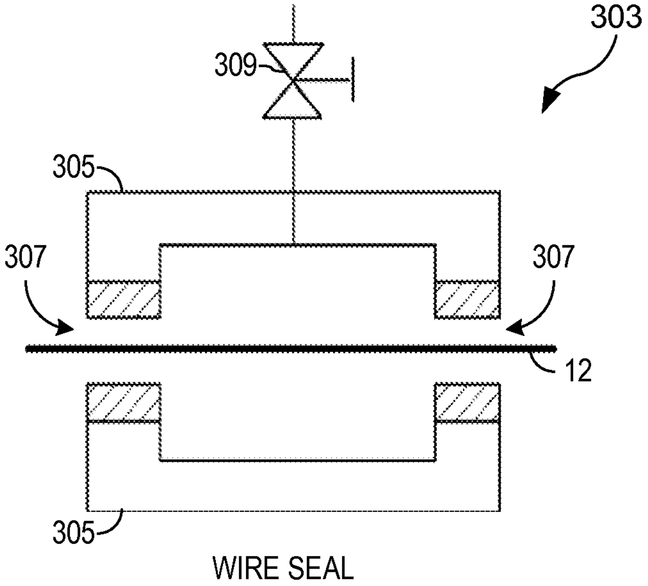
FIG. 5 is a schematic representation of a wire seal.

Turning now to FIG. 5, the wire seal 303 may be a device through which the wire enters or exits a process block. The wire seal may be a hollow body 305 made of an insulating material, such as a ceramic material, and designed with a close fitting, polished nickel bore hole 307 through which the wire travels. Each wire seal 303 may have a vent valve 309, which may be closed to allow evacuation of gases from the process blocks and may be opened to prevent pressure buildup in the process block during normal operation. Wire seals 303 operate to prevent the mixing of gas from adjacent process blocks and may be electrically insulated from the process block 301.

Payout Spool 302

Turning now to FIG. 6, the payout spool process block 302 may have a spool 324 for holding the unprocessed wire 12, and a drive motor 326 coupled to the spool 324. The drive motor 326 may be coupled to the spool 324 by a drive belt 328 or by any other suitable coupling. The drive motor 326 may be operated to allow the wire 12 to move into the process blocks while maintain a constant tension on the wire. In an embodiment, the spool 324 and the wire 12 are preferably grounded electrically at the payout spool process block 302. The unprocessed wire 12 exits the payout spool process block 302 through a wire seal 303. For convenience, the wire will be referred to as 'wire 12' throughout the following description of the continuous production process, even though it may be understood that the wire 12 will not remain 'unprocessed' as it passes through the various process blocks, and may acquire coatings of nickel and graphene as the wire 12 passes through certain process blocks.

First Wire Cleaning Block 304

Turning now to FIG. 7, the first wire cleaning block 304 may be a multi-process block, mechanically removing oxide, dirt, grease, and other impurities from the surface of the wire. The first wire cleaning block 304 may include a burnishing cell 330, a water cleaning cell 332, a first alcohol cleaning cell 334A and a second alcohol cleaning cell 334B. The wire 12 may enter the first wire cleaning block 304 through a first wire seal 303A, and may thereafter be conveyed through the burnishing cell 330, the water cleaning cell 332, the first alcohol cleaning cell 334A and the second alcohol cleaning cell 334B before exiting the block 304 through a second wire seal 303B.

Figure 8:
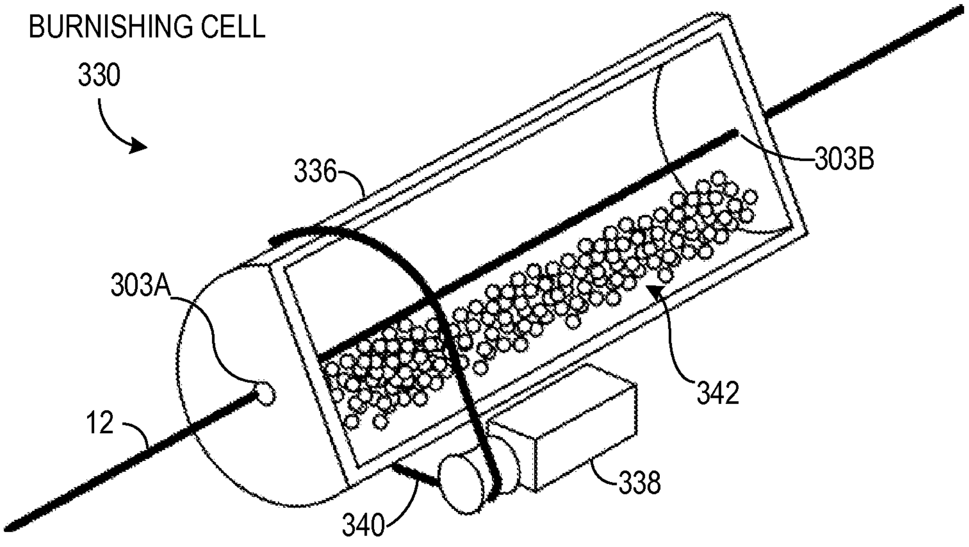
FIG. 8 illustrates a burnishing cell.

Turning now to FIG. 8, the burnishing cell 330 may be a hollow cylindrical body, or tube 336, mounted for rotation about its longitudinal axis, and coupled to a drive motor 338 for rotating the tube 336. The drive motor 338 may be coupled to the tube 336 by a drive belt 340 or by any other suitable coupling. A wire seal 303A, 303B may be provided at each end of the tube 336, through which the wire 12 may enter and exit the burnishing cell 330. The burnishing cell 330 may contain a large quantity of ceramic balls 342 which, by virtue of a tumbling action with the rotating tube 336, operate to clean and polish the wire 12 as the wire 12 passes through the burnishing cell 300. A burnishing cell 300 may be present in one or more process blocks, as required. The burnishing cell 300 exposes the wire 12 to the agitated ceramic balls 342 to clean and polish the surface of the wire 12.

A typical cleaning cell has rollers which dip the wire into various chemicals to clean the wire. Various cleaning cells may be combined in a process block. A water cell has water as the cleaning solution. An isopropyl alcohol cell has isopropyl alcohol as the cleaning solution. A phosphoric acid cell has dilute phosphoric acid as the cleaning solution.

Figure 9:
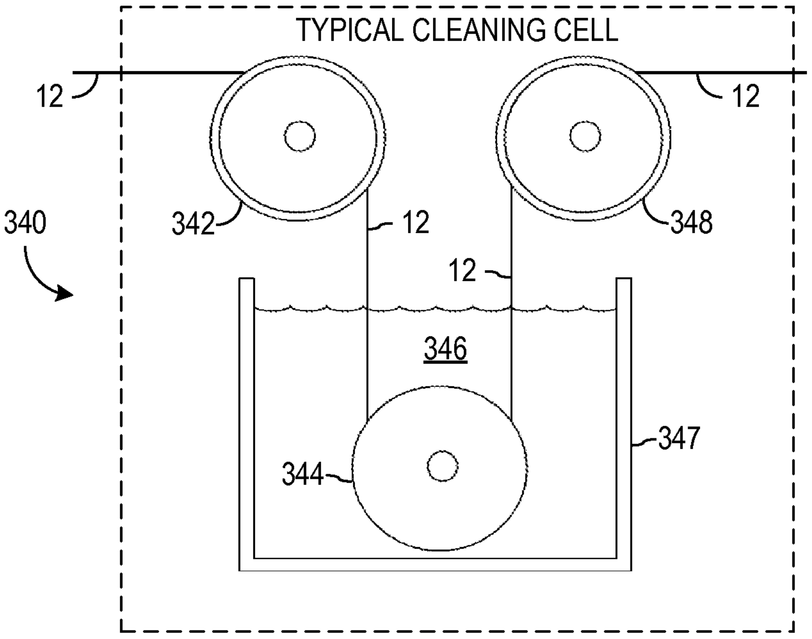
FIG. 9 is a schematic representation of a typical cleaning cell.

Turning now to FIG. 9, typical cleaning cell 340 may have a nickel plated input roller 342 mounted for rotation within cell 340 for conveying the wire towards a bath of liquid cleaning solution 346, such as water, isopropyl alcohol, or dilute phosphoric acid contained within a suitable vessel 347. A ceramic roller 344 may be mounted for rotation within the bath of liquid cleaning solution 346 for conveying the wire into the liquid cleaning solution 346 and back out again. A nickel plated output roller 348 mounted for rotation within cell 340 may be provided to receive the wire from the bath of liquid cleaning solution 346 and convey the wire towards the next cleaning cell or process block.

Nickel Plating Block 306

Turning now to FIG. 10, the Nickel Plating Block 306 may be used to electroplate pure nickel onto the moving wire 12 using a suitable, nickel-based electroplating solution 350 and a 3-volt direct current voltage applied between the wire cathode and a nickel anode 352. In an embodiment, the electroplating solution 350 may be a solution of nickel ammonium sulfate (NiSO4.(NH4)2SO4.6H2O) solution (8 oz. per gallon of distilled water). As shown in FIG. 10, the wire 12 may enter the nickel plating block 306 through a first wire seal 303A. A nickel-plated input roller 354 mounted for rotation within block 306 may be used to convey the wire 12 towards the electroplating solution 350 contained in a suitable vessel 355. A ceramic roller 356 may be mounted for rotation within the electroplating solution 350 for conveying the wire 12 into the electroplating solution 350 and back out again. A nickel-plated output roller 358 mounted for rotation within block 306 may be provided to receive the wire 12 from the electroplating solution 350 and convey the wire towards a second wire seal 303B for exiting the nickel plating block 306.

In an embodiment, the anode 352 may be a coaxial tube of nickel, surrounding the wire 12 to plate the wire evenly, and may be provided with stripper seals 378A, 378B. Stripper seals 378A, 378B may be used at the inlet and outlet, respectively, of the vessel 355, and may be used to clean and dry the wire 12. The dwell time may be adjusted to ensure that only a thin layer of nickel is evenly plated onto the wire 12. In an embodiment, the wire 12 is preferably held at ground potential in the nickel plating block 306 by grounding the nickel-plated input roller 354, and the nickel anode 352 may be held at 3 volts via an electrical connection 353. In an embodiment, a heater 360 may be used to maintain the electroplating solution 350 at a suitable temperature, such as approximately 90° C.

Second Wire Cleaning Block 308

After exiting the nickel plating block 306, the wire 12 may enter a second wire cleaning block 308 through a first wire seal 303A. As shown in FIG. 11, the second wire cleaning block 308 may have a water cleaning cell 362, a first isopropyl alcohol cleaning cell 364A, and a second isopropyl alcohol cleaning cell 364B. It should be understood that water cleaning cell 362, first isopropyl alcohol cleaning cell 364A, and second isopropyl alcohol cleaning cell 364B may be constructed similarly to the typical cleaning cell 340 as shown in FIG. 9. After exiting the second wire cleaning block 308, through a second wire seal 303B, the wire 12 may be conveyed towards the nickel crystallizing block 310.

Nickel Crystallizing Block 310

Figure 12:
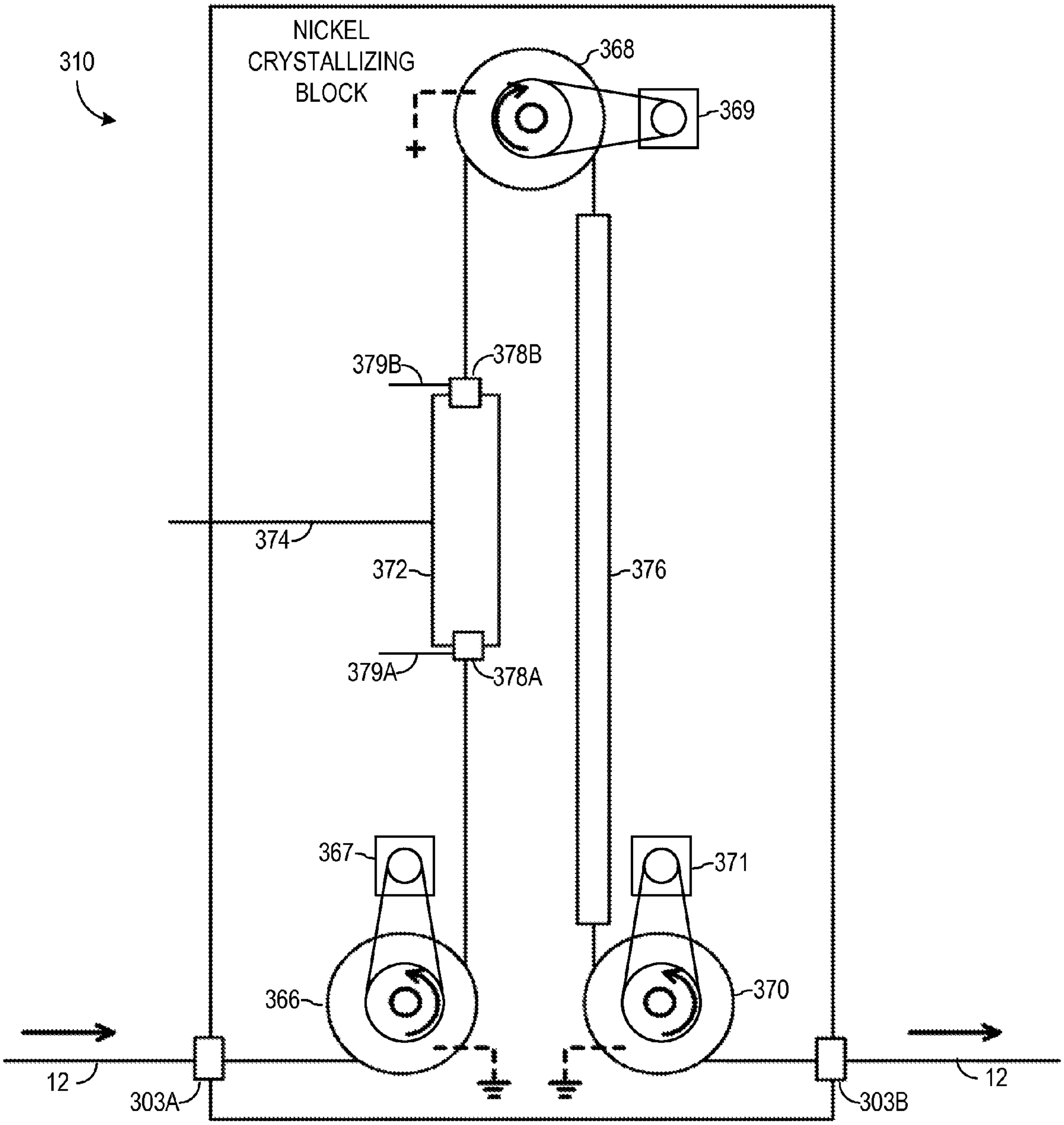
FIG. 12 is a schematic representation of a nickel crystallizing process block.

The nickel crystallizing block 310 may be used to heat the nickel that has been electroplated onto wire 12 to the melting temperature of the nickel, and to slowly allow the nickel to cool, thereby changing the nickel to monocrystalline nickel. As shown in FIG. 12, the wire 12 may enter the nickel crystallizing block 310 through a first wire seal 303A. A first nickel-plated drive roller 366 may be mounted for rotation within block 310 and driven by a first drive motor 367 for receiving the wire 12 and conveying the wire 12 towards a second nickel-plated drive roller 368. The second nickel-plated drive roller 368 may also be mounted for rotation within block 310, and may be driven by a second drive motor 369 for conveying the wire 12 towards a third nickel-plated drive roller 370. The third nickel-plated drive roller 370 may also be mounted for rotation within block 310, and may be driven by a third drive motor 371 for conveying the wire 12 towards a second wire seal 303B before exiting the nickel crystallizing block 310. Each of the three nickel-plated drive rollers 366, 368, 370 may preferably be nickel plated to reduce contamination of the surface of the wire 12. Note that each drive motor may be coupled to its corresponding nickel-plated drive roller by any suitable means, such as, for example, a drive belt, a gear train, or by direct coupling of the roller to a drive shaft of the motor. The first, second, and third nickel-plated drive rollers 366, 368, 370 are preferably driven at the same speed by first, second, and third drive motors 367, 369, 371. The details of coupling the drive motors to the drive rollers, and driving the rollers at the same speed, are considered to be within the average skill of electrical and mechanical arts.

In operation, wire 12 rolls across first nickel-plated roller 366, which may be electrically grounded. A positive DC voltage may be applied to second nickel-plated drive roller 368, such that the wire 12 may be heated to approximately 1200° C. by resistance heating. Wire 12 may be conveyed through an oxide layer development tube 372 disposed between first nickel-plated roller 366 and second nickel-plated roller 368, where wire 12 may be exposed to an atmosphere of 99.5% argon, and 0.5% oxygen provided via an input channel 374. The oxygen burns off surface impurities and establishes a thin oxide layer on the nickel, which provides stability for the wire 12 during subsequent processing in a mono-crystallization furnace 376. Stripper seals 378A, 378B may be used at the inlet and outlet of oxide layer development tube 372, and a pressure gradient established between the interior of oxide layer development tube 372 and the surrounding argon atmosphere within nickel crystallizing block 310, may be utilized to prevent oxygen from leaking into the argon atmosphere of nickel crystallizing block 310.

Figure 26:
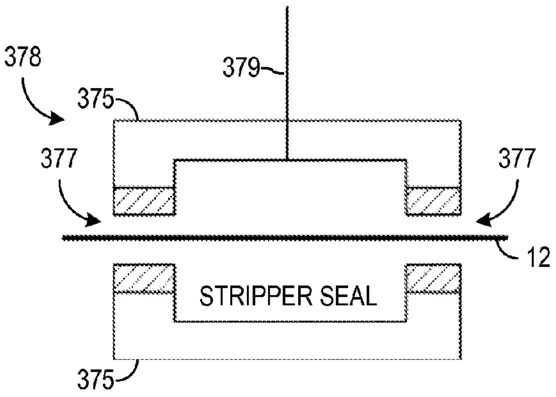
FIG. 26 is a schematic representation of a stripper seal.

Turning now to FIG. 26, a stripper seal 378 is a device which may be constantly vented to atmosphere, and may be used to reduce the mixing of gases on either side of the seal. The stripper seal may be a hollow body 375 made of an insulating material, such as a ceramic material, and designed with a close fitting, polished nickel bore hole 377 through which the wire travels. Each stripper seal 378 may have a vent 379, which may be open to the argon atmosphere of nickel crystallizing block 310.

Figure 13:
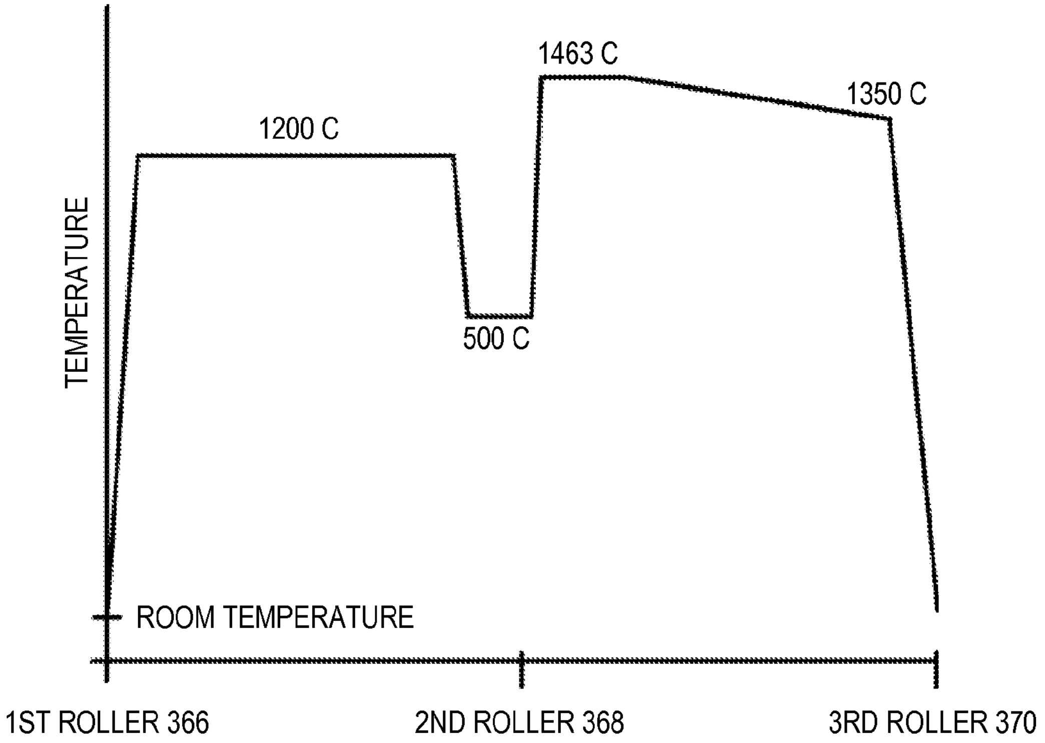
FIG. 13 illustrates a temperature profile within the nickel crystallizing process block.

FIG. 13 illustrates the temperature profile of the wire 12 as the wire 12 is conveyed through the nickel crystallizing block 310. As the wire 12 is conveyed around the second nickel-plated drive roller 368, the wire 12 may be permitted to cool to approximately 500° C., the temperature to which the second nickel-plated drive roller 368 may be heated. The wire 12 may then be conveyed through a mono-crystallization furnace 376 disposed between the second nickel-plated roller 368 and the third nickel-plated drive roller 370. The mono-crystallization furnace 376 may be used to heat the wire 12 to a temperature of 1463° C. by a combination of resistance heating and radiant heating. Thereafter, the wire 12 may be permitted to cool slowly to approximately 1360° C., whereby the nickel layer may be changed to monocrystalline nickel. As the wire 12 is conveyed around the third nickel-plated drive roller 370, the wire 12 may be permitted to cool to room temperature.

Figure 14:
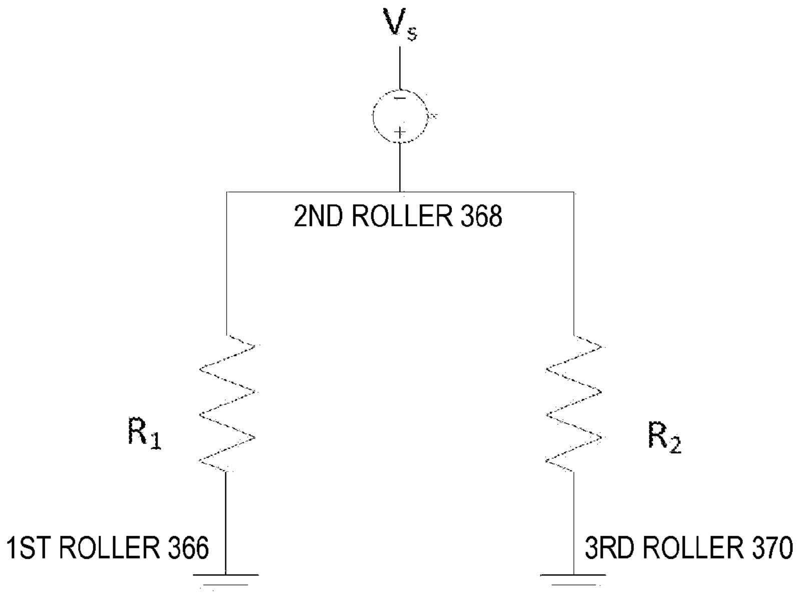
FIG. 14 is a schematic diagram showing the electrical equivalent of the nickel crystallizing block.

FIG. 14 illustrates the electrical equivalent of nickel crystallizing block 310, wherein R1 represents the resistance of a portion of wire 12 extending between the first nickel-plated drive roller 366 and the second nickel-plated drive roller 368, and R2 represents the resistance of a portion of wire 12 extending between the second nickel-plated drive roller 368 and the third nickel-plated drive roller 370. The relative resistance of R1/R2 can be controlled by changing the position of one of the grounded rollers, either the first nickel-plated drive roller 366 or the third nickel-plated drive roller 370. Changing the position of one of the grounded rollers, 366 or 370, may change the length of wire 12 extending between grounded roller 366 or 370 and the second nickel-plated drive roller 368, which may have a positive DC voltage Vs applied thereto, and may thereby change the amount of resistance heating in the different portions of the wire 12 relative to each other.

Third Wire Cleaning Block 314

Figure 15:
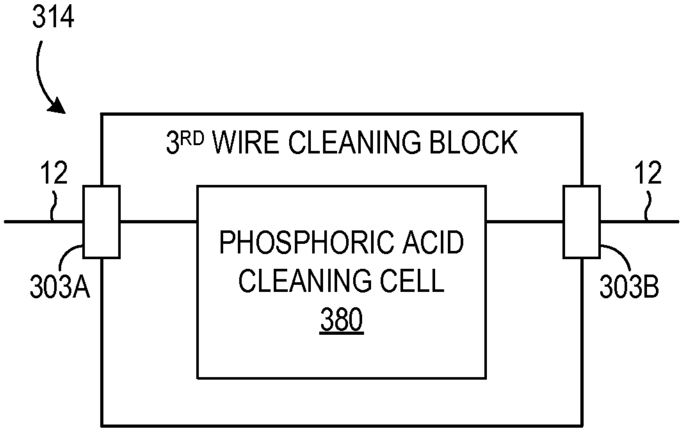
FIG. 15 is a schematic representation of a third wire cleaning process block.

After exiting the nickel crystalizing block 310, the wire 12 may enter a third wire cleaning block 314 through a first wire seal 303A. As shown in FIG. 15, the third wire cleaning block 314 may have a phosphoric-acid cleaning cell 380, which may be constructed similarly to the typical cleaning cell 340 as shown in FIG. 9, but having a dilute phosphoric acid as the cleaning solution 346. The phosphoric acid cleaning solution may be used to remove the stabilizing oxide layer, developed in the oxide layer development tube 372 of nickel crystalizing block 310, from the surface of the monocrystalline nickel formed on the surface of wire 12 in the mono crystallization furnace 376 of nickel crystalizing block 310. After exiting the third wire cleaning block 314, through a second wire seal 303B, the wire 12 may be conveyed towards the carbon absorption block 316.

Carbon Absorption Block 316

The carbon absorption block 316 may be used to heat the layer of monocrystalline nickel to approximately 900° C. in the presence of a methane/argon atmosphere, thereby allowing carbon from the methane atmosphere to absorb into the nickel. The atmosphere in the carbon absorption block 316 may be maintained at approximately 80% methane and 20% argon. The layer of monocrystalline nickel on the surface of wire 12 may be allowed to cool gradually, thereby promoting the formation of graphene on the surface of the nickel.

Figure 16:
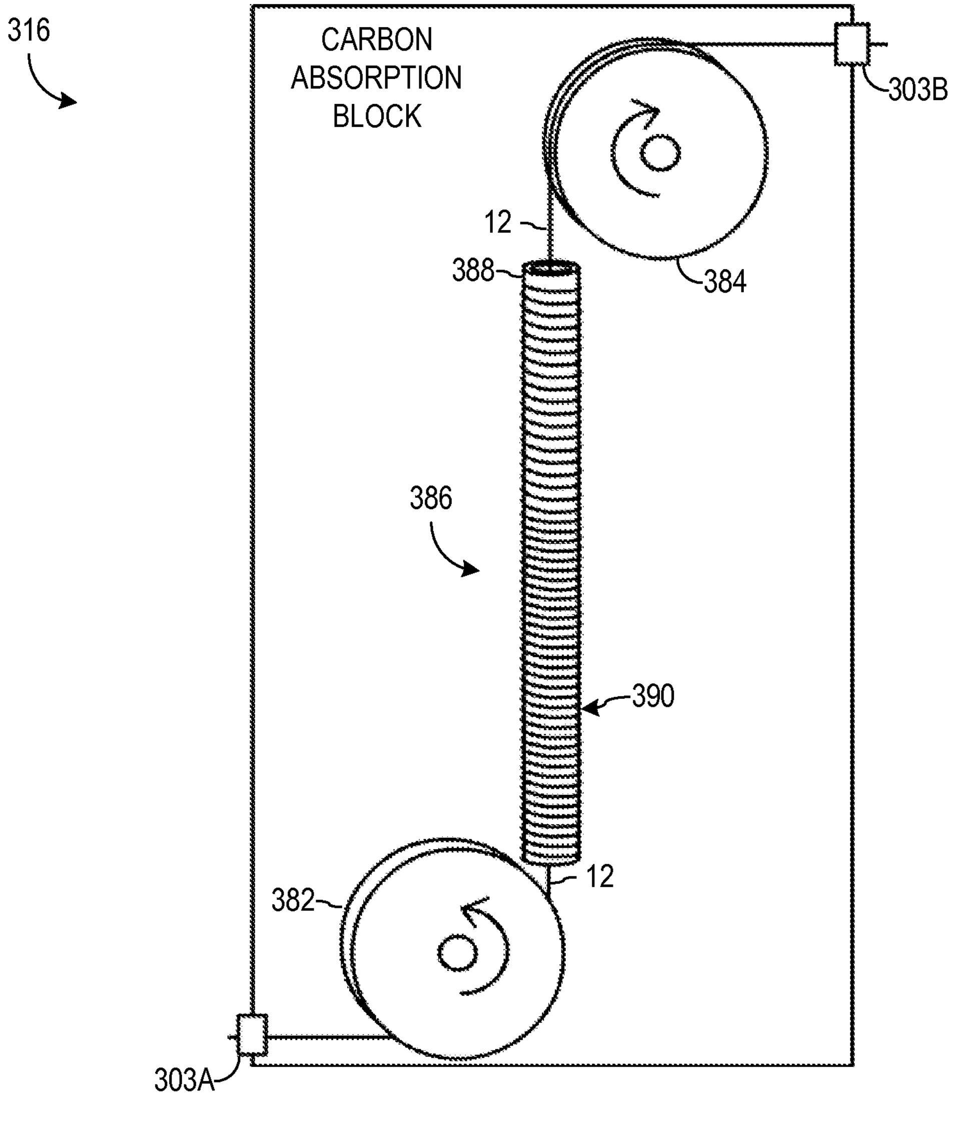
FIG. 16 is a schematic representation of a carbon absorption process block.

As shown in FIG. 16, the wire 12 may enter the carbon absorption block 316 through a first wire seal 303A. A first nickel-plated roller 382 may be mounted for rotation for receiving the wire 12 and conveying the wire 12 towards a second nickel-plated roller 384. The second nickel-plated roller 384 may also be mounted for rotation, for conveying the wire 12 towards a second wire seal 303B before exiting the carbon absorption block 316. Each of the two rollers 382, 384 may preferably be nickel plated to reduce contamination of the surface of the wire 12. A carbon absorption furnace 386 may be disposed between the first roller 382 and the second roller 384 for heating the wire 12 being conveyed there through. The carbon absorption furnace 386 may be configured as a ceramic tube 388 having multiple windings of resistance-heating wire 390, such as nichrome wire, wound spirally around the surface of the ceramic tube 388. In an embodiment, the multiple windings of resistance-heating wire 390 may be spaced more closely together near an input end of the carbon absorption furnace 386 and may be spaced farther apart near an output end of the carbon absorption furnace 386, thereby establishing a negative temperature gradient from the input end to the output end for allowing the layer of monocrystalline nickel on the surface of wire 12 to cool gradually, thereby promoting the formation of graphene on the surface of the nickel.

As shown in FIG. 17, the wire 12 being conveyed through the carbon absorption furnace 386 may be heated to approximately 900° C. in the presence of the methane/argon atmosphere, whereby carbon from the methane atmosphere may absorb into the nickel. A considerable amount of carbon soot may also form on the surface of the wire during the carbon absorption process. As the heated wire 12 is conveyed across second roller 384, the wire 12 may be allowed to cool to approximately 350° C.-250° C. before exiting the carbon absorption block 316 through second wire seal 303B. After exiting the carbon absorption block 314, the wire 12 may be conveyed towards the fourth wire cleaning block 316 for removing any carbon soot that may form on the surface of the wire 12 during the carbon absorption process.

Fourth Wire Cleaning Block 316

Turning now to FIG. 18, the fourth wire cleaning block 316 may be another multi-process block, mechanically removing carbon soot and other impurities from the surface of the wire 12. The fourth wire cleaning block 316 may include a burnishing cell 392, a water cleaning cell 394, a first alcohol cleaning cell 396A and a second alcohol cleaning cell 396B. It should be understood that burnishing cell 392 may be constructed similarly to the burnishing cell 330 as shown in FIG. 8. It should further be understood that water cleaning cell 394, first isopropyl alcohol cleaning cell 396A, and second isopropyl alcohol cleaning cell 396B may be constructed similarly to the typical cleaning cell 340 as shown in FIG. 9. The wire 12 may enter the fourth wire cleaning block 316 through a first wire seal 303A, and may thereafter be conveyed through the burnishing cell 392, the water cleaning cell 394, the first alcohol cleaning cell 396A and the second alcohol cleaning cell 396B before exiting the fourth wire cleaning block 316 through a second wire seal 303B. After exiting the fourth wire cleaning block 316, the wire 12 may be conveyed to wire drawing block 318.

Wire Drawing Block 318

Figure 19:
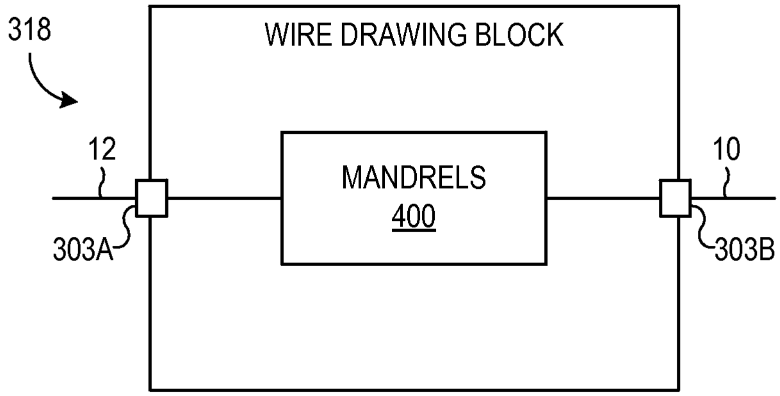
FIG. 19 is a is a schematic representation of a wire drawing process block.
Figure 20:
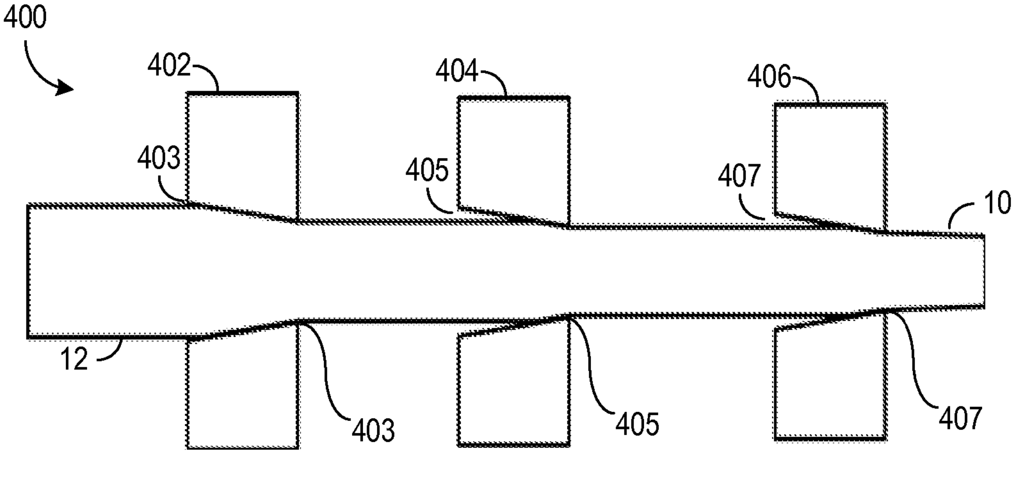
FIG. 20 illustrates a wire drawing process.

Turning now to FIG. 19, wire drawing block 318 may be configured as a typical process block having a first wire seal 303A through which wire 12 may enter the process block, and a second wire seal 303B through which wire 12 may exit the process block. The wire drawing block 318 may have mandrels 400 disposed between first wire seal 303A and second wire seal 303B, through which wire 12 may be pulled for reducing the diameter of the wire 12. In an embodiment, the mandrels 400 may comprise, for example, a first heated mandrel 402, a second heated mandrel 404, and a third heated mandrel 406. The mandrels 400 may be provided with successively smaller orifices 403, 405, 407 through which the wire 12 is pulled. The orifices 403, 405, 407 may be circular for processing a wire 12, although it should be understood that the orifices 403, 405, 407 may be rectangular for processing a ribbon 22, and may be configured in any practical shape for processing any extruded metal base material. As the wire 12 is pulled through each of the succession of mandrels 400, the diameter of the processed wire may be reduced, and any multiple layers of graphene which may be produced in the carbon absorption block 314 are forced to slip past one another until a single layer of graphene remains in each layer. The wire exiting the wire drawing block 318 may be considered to be a GMMLL wire 10 having a first lamination 16 comprising a layer of monocrystalline nickel 17 deposited on the surface 14 of wire core 12, and a layer of graphene 18 deposited over the layer of monocrystalline nickel 17.

Wire Drive Block 320

Figure 21:
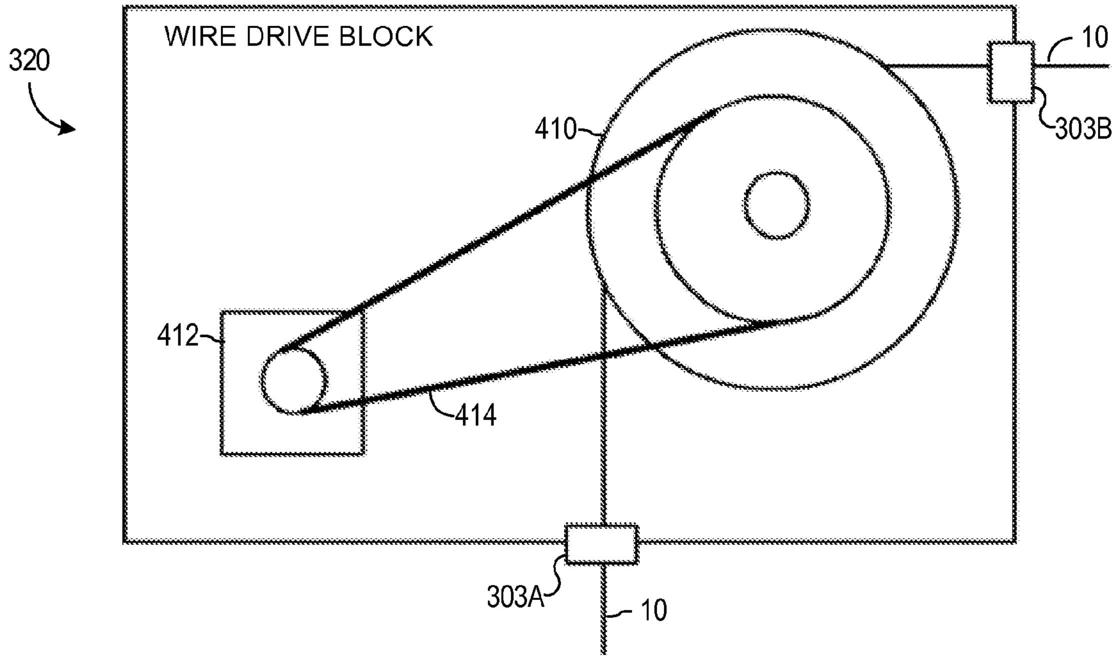
FIG. 21 is a is a schematic representation of a wire drive process block.

Turning now to FIG. 21, wire drive block 320 may be used to pull the wire 12 through the various process blocks. Multiple wire drive blocks may be used wherever additional pulling force is needed to move the wire 12 through the process blocks. Multiple wire drive blocks may be synchronized to keep an even tension on the wire 12 throughout the process. As shown in FIG. 21, the wire 12 may enter the wire drive block 320 through a first wire seal 303A, and may be conveyed across a drive spool 410 mounted for rotation within the wire drive block 320. The drive spool 410 may be driven by a drive motor 412 coupled to the drive spool 410 by a suitable coupling, such as a drive belt 414.

Take-Up Spool 322

Figure 22:
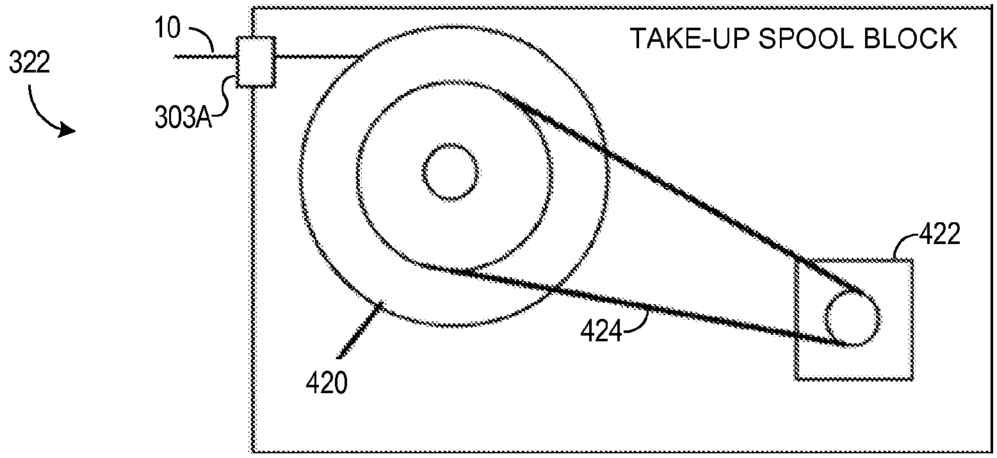
FIG. 22 is a is a schematic representation of a take-up spool process block.

Turning now to FIG. 22, the take-up spool block 322 may be used to gather the finished GMMLL wire 10 onto a take-up spool 420. As shown in FIG. 22, the GMMLL wire 10 may enter the take-up spool block 322 through a first wire seal 303A, and may be conveyed towards the take-up spool 420 mounted for rotation within the take-up spool block 322. The take-up spool 420 may be driven by a drive motor 422 coupled to the take-up spool 420 by a suitable coupling, such as a drive belt 424. In an embodiment, the metal take-up spool 420 and the GMMLL wire 10 may be electrically grounded at this point.

Additional Process Blocks

The continuous production process 300 illustrated in FIG. 3 may be utilized to produce a GMMLL wire 10, or a GMMLL ribbon 20, or other GMMLL product, having a single lamination comprising a layer of monocrystalline nickel 16 (or 26) deposited on the base material 12 (or 22) with a layer of graphene 18 (or 28) deposited over the layer of monocrystalline nickel 16 (or 26) as shown in FIG. 1 (or FIG. 2). If a second lamination of nickel and graphene is desired, additional process blocks may be added to the continuous production process 300 for depositing a second layer of monocrystalline nickel on the surface of the first layer of graphene, and for depositing a second layer of graphene on the surface of the second layer of monocrystalline nickel.

Figure 23:
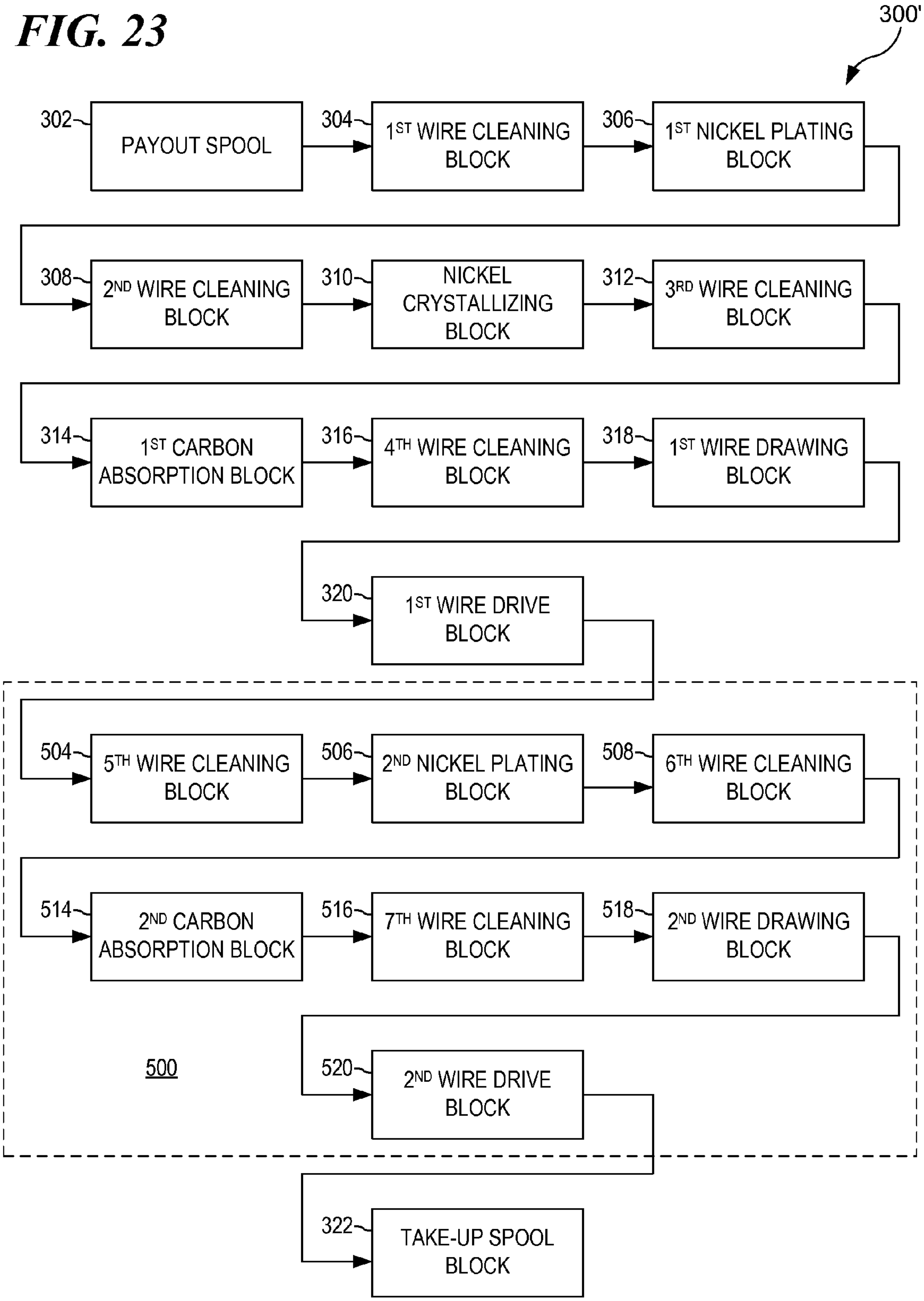
FIG. 23 is a block diagram of an apparatus for producing a wire or ribbon having two multi-layer coatings, according to an aspect of the invention.

As shown in FIG. 23, a continuous production process 300' may have a first sequence of process blocks 302-320 as described hereinabove and as shown in FIG. 3 with respect to the continuous production process 300, and may also have a second sequence of process blocks 500 including additional process blocks 504-508 and 514-520 inserted between 1$^{st}$ wire drive block 320 and take-up spool block 322. The process 300' may begin by loading the wire base material onto a payout spool in process block 302 in the same way as in process 300, and proceeds in the same way as in process 300 through process blocks 304-320, including 1$^{st}$ wire cleaning block 304, 1$^{st}$ nickel plating block 306, 2$^{nd}$ wire cleaning block 308, 1$^{st}$ nickel crystallizing block 310, 3$^{rd}$ wire cleaning block 312, 1$^{st}$ carbon absorption block 314, 4$^{th}$ wire cleaning block 316, 1$^{st}$ wire drawing block 318, and 1$^{st}$ wire drive block 320. Thereafter, the process 300' continues by conveying the processed GMMLL wire through a sequence of duplicative process blocks 504-508 and 514-520, including a 5$^{th}$ wire cleaning block 504, a 2$^{nd}$ nickel plating block 506, a 6$^{th}$ wire cleaning block 508, a 2$^{nd}$ carbon absorption block 514, a 7$^{th}$ wire cleaning block 516, a 2$^{nd}$ wire drawing block 518, and a 2$^{nd}$ wire drive block 520 before the GMMLL wire is conveyed to the take-up spool block 322.

Figure 28:
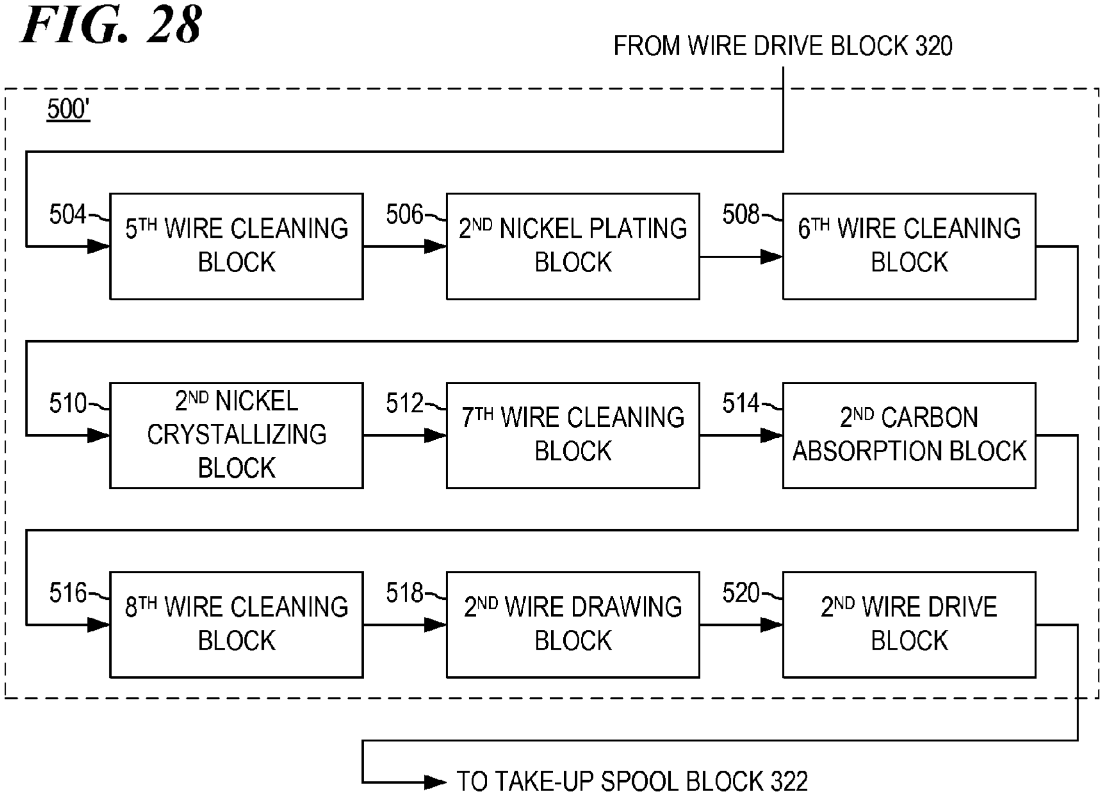
FIG. 28 is a block diagram of an alternate sequence of additional process blocks, according to an aspect of the invention.

It may be noted that duplicative process blocks 504-508 and 514-520 may not include a second nickel crystallizing block corresponding to nickel crystallizing block 310, because it is believed that the process of depositing a layer of nickel onto a GMMLL wire by electroplating nickel over an existing layer of graphene may naturally result in depositing monocrystalline nickel rather than forming an amorphous layer of nickel. It may further be noted that in the absence of a duplicative process block corresponding to nickel crystallizing block 310, a duplicative process block corresponding to wire cleaning block 312 may not be required. However, should a second nickel crystallizing block become necessary, it should be understood that additional duplicative process blocks corresponding to nickel crystallizing block 310 and wire cleaning block 312 may be inserted between a wire cleaning block 508 and a carbon absorption block 514, as shown in FIG. 28.

It should be understood that the duplicative process blocks 504-508 and 514-520 may be constructed in the same manner as process blocks 304-308 and 314-320, respectively, and may operate in the same manner for the same purposes. For example, the 5th wire cleaning block 504 may be a multi-process block having a burnishing cell, a water cleaning cell, and two alcohol cleaning cells as in the 1st wire cleaning block 304, and may operate in a similar fashion with correspondingly similar results. In the same way, the 6th wire cleaning block 508 may correspond to the 2nd wire cleaning block 308, and the 7th wire cleaning block 516 may correspond to the 4th wire cleaning block 316. It should also be understood that the 2nd nickel plating block 506 may be similar or identical to 1st nickel plating block 306, and may operate in a similar fashion with correspondingly similar results. It should be further understood that the 2nd carbon absorption block 514 may be similar or identical to 1st carbon absorption block 314, and may operate in a similar fashion with correspondingly similar results. In the same way, the 2nd wire drawing block 518 may be similar or identical to 1st wire drawing block 318, except that the orifices provided in the heated mandrels may be somewhat larger in diameter to account for a larger diameter of the finished wire, now having two laminations of nickel and graphene layers. The 2nd wire drive block 520 may be similar or identical to 1st wire drive block 320, and may serve to convey the finished wire having two laminations of nickel and graphene layers towards the take-up spool block 322.

Figure 24A:
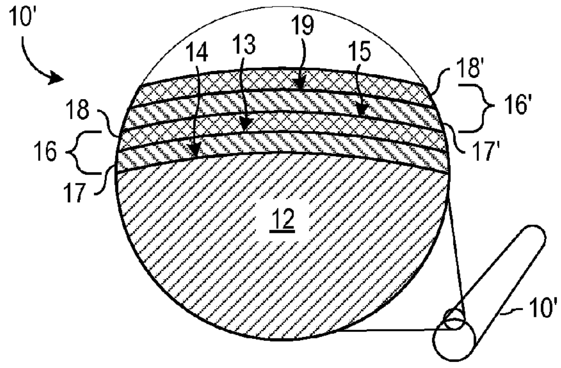
FIG. 24A illustrates wire having two multi-layer coatings according to an aspect of the invention.
Figure 24B:
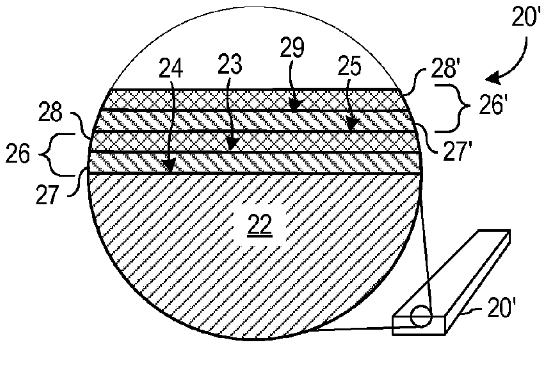
FIG. 24B illustrates a ribbon having two multi-layer coatings according to an aspect of the invention.

Turning now to FIG. 24A, a GMMLL wire 10' having two laminations of nickel and graphene layers may have a core 12 comprising a metallic base material having a surface 14. A first lamination 16 may be a first layer of monocrystalline nickel 17 deposited on the surface 14 of wire core 12, and a first layer of graphene 18 deposited on the surface 13 of the first layer of monocrystalline nickel 17. A second lamination 16' may be a second layer of monocrystalline nickel 17 deposited on a surface 15 of the first layer of graphene 18, and a second layer of graphene 18' deposited on a surface 19 of the second layer of monocrystalline nickel 17'. As shown in FIG. 24B, a GMMLL ribbon 20' having two laminations of nickel and graphene layers may have a core 22 comprising a metallic base material having a surface 24. A first lamination 26 may be a first layer of monocrystalline nickel 27 deposited on the surface 24 of ribbon core 22, and a first layer of graphene 28 deposited on the surface 23 of the first layer of monocrystalline nickel 27. A second lamination 26' may be a second layer of monocrystalline nickel 27' deposited on a surface 25 of the first layer of graphene 28, and a second layer of graphene 28' deposited on a surface 29 of the second layer of monocrystalline nickel 27'. Subsequent laminations may also be applied in alternating layers of nickel and graphene in the manner described previously. If a third lamination of nickel and graphene layers is desired, additional process blocks corresponding to process blocks 504-520, as shown in FIG. 23, may be inserted between the $2^{nd}$ wire drive block 520 and the take-up spool block 322.

Figure 25:
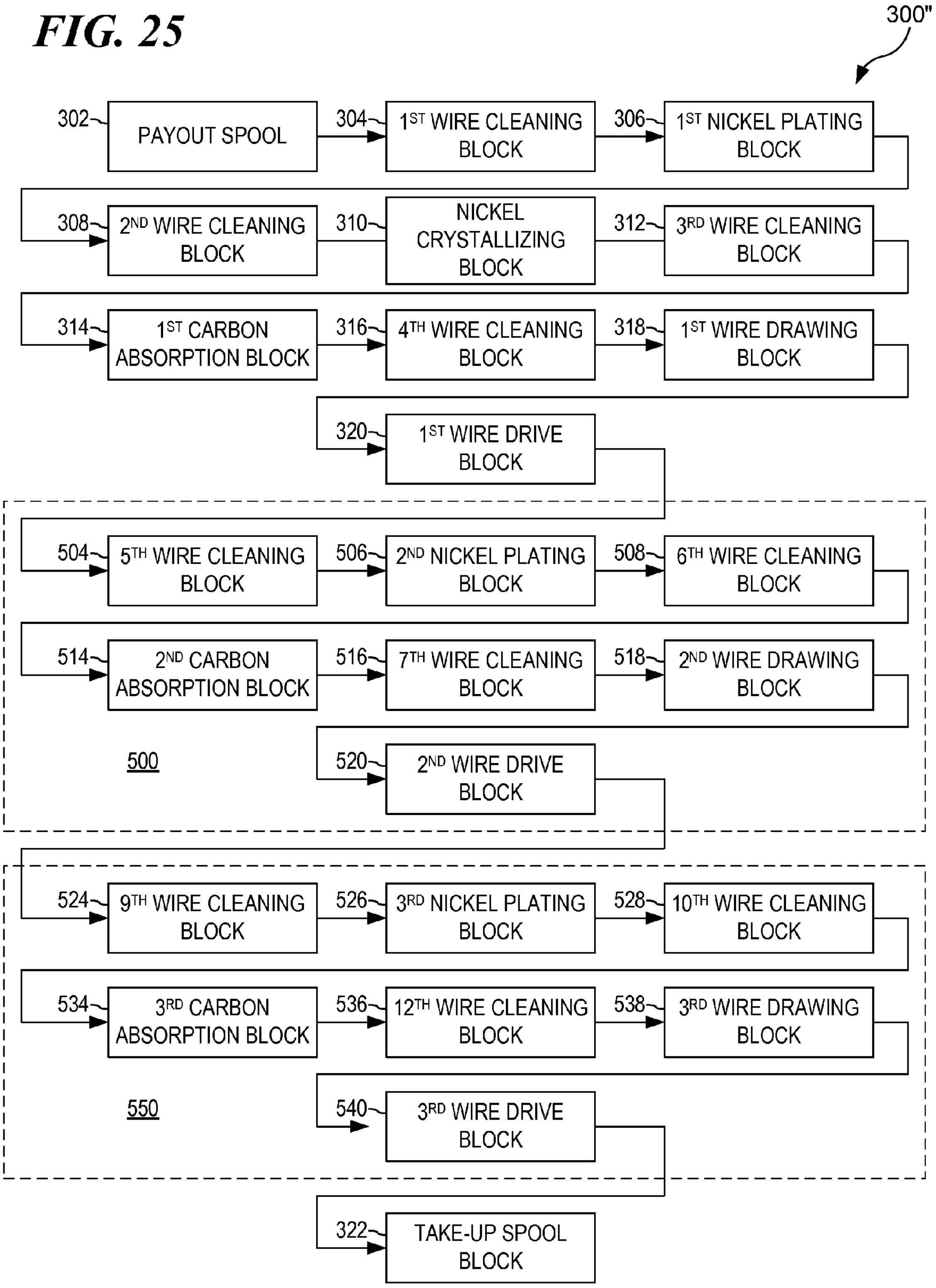
FIG. 25 is a block diagram of an apparatus for producing a wire or ribbon having an additional multi-layer coating, according to an aspect of the invention.

As shown in FIG. 25, a continuous production process 300" may have a first sequence of process blocks 302-320 as described hereinabove and as shown in FIG. 3, a second sequence of process blocks 500 corresponding to duplicative process blocks 504-508 and 514-520 as described hereinabove and as shown in FIG. 23, and may also have an additional sequence of process blocks 550, including three wire cleaning process blocks 524, 528, and 536 corresponding to process blocks 504, 508, and 516, respectively, an additional nickel plating block 526 corresponding to nickel plating block 506, an additional carbon absorption block 534 corresponding to carbon absorption block 514, an additional wire drawing block 538 corresponding to wire drawing block 518, and an additional wire drive block 540 corresponding to wire drive block 520. It may be understood that further duplicative process blocks corresponding to process blocks 504-508 and 514-520, or to process blocks 524-528 and 534-540, may be inserted into the process prior to take-up spool block 322 for applying additional lamination(s) of nickel and graphene to a GMMLL wire 10' or GMMLL ribbon 20'.

Turning now to FIG. 28, should a second nickel crystallizing block become necessary, it may be understood that a duplicative nickel crystallizing block 510 corresponding to nickel crystallizing block 310 and a duplicative wire cleaning block 512 corresponding to wire cleaning block 312 may be inserted between wire cleaning block 508 and carbon absorption block 514. As shown in FIG. 28, an alternate sequence of process blocks 500' may have a 5 wire cleaning block 504 corresponding to 1 wire cleaning block 304, a 2 nickel plating block 506 corresponding to 1 nickel plating block 306, a 6 wire cleaning block 508 corresponding to 2 wire cleaning block 308, a 2 nickel crystallizing block 510 corresponding to 1 nickel crystallizing block 301, a 7 wire cleaning block 512 corresponding to 3 wire cleaning block 312, a 2 carbon absorption block 514 corresponding to 1st carbon absorption block 314, an 8th wire cleaning block 516 corresponding to 4 wire cleaning block 316, a 2 wire drawing block 518 corresponding to 1 wire drawing block 318, and a 2 wire drive block corresponding to 1 wire drive block 320. The alternate sequence of additional process blocks 500' may receive the GMMLL wire 10 or GMMLL ribbon 20 from wire drive block 320, process the wire 10 or ribbon 20 as described above with respect to the process 300 as shown in FIG. 3, and thereafter convey the additionally processed wire 10 or ribbon 20 towards take-up spool 322 in a manner corresponding to the process 300' as shown in FIG. 23. Alternatively, the additionally processed wire 10 or ribbon 20 may be conveyed from the 2 wire drive block 520 towards a third sequence of process block 550 as shown in FIG. 25. It may be understood that the third sequence of process blocks 550, and any subsequent sequence of duplicative process blocks, may be modified to further include an additional nickel crystallizing block corresponding to 1 nickel crystallizing block 310 and an additional wire cleaning block corresponding to 3 wire cleaning block 312, in the manner shown with respect to alternate sequence of process blocks 500' as shown in FIG. 28.

Batch Production Process

The foregoing discussion has demonstrated a method for continuous processing for wire or ribbon. Batch processing of any shape can be accomplished using the same techniques with the exception that for each process, the batch is isolated in a separate chamber and processed in the same way as the wire or ribbon in the corresponding process block.

GMMLL Shape Fabrication

Figure 27:
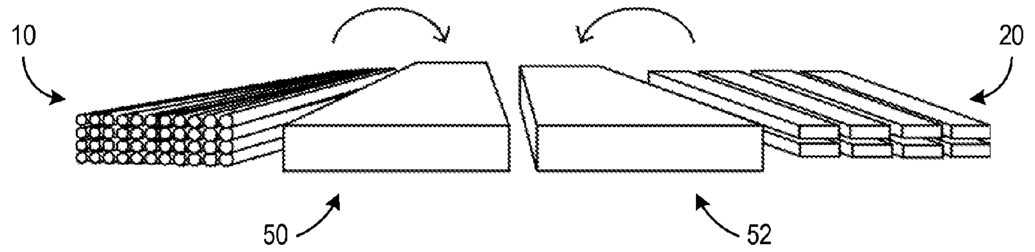
FIG. 27 illustrates wire or ribbon having multi-layer coatings formed into another shape.

GMMLL wire and ribbon can be combined under heat and pressure to produce any shape, as shown in FIG. 27, whereby multiple GMMLL wires 10 may be combined under heat and pressure to produce a bar shape 50, or whereby multiple GMMLL ribbons 20 may be combined under heat and pressure to produce a bar shape 52. Multiple GMMLL wires can also be assembled together using epoxy adhesive to achieve various shapes.

GMMLL Applications

GMMLL wire and ribbon can be used to replace conventional materials where high strength, small size, and reduced weight produce economies. GMMLL cable may have use in power transmission lines, offering higher strength, lower weight, higher current carrying capacity, and greater corrosion resistance than conventional power transmission cables. GMMLL wire may be used in electrical appliances, reducing heat loss from resistance heating and making the appliances more efficient. GMMLL wire mesh may have uses as a reinforcing material such as for resin based material used in aircraft. GMMLL ribbon may be combined into any structural shape, replacing conventional metals with the advantage of lighter weight and greater strength. GMMLL materials have improved heat transfer and corrosion resistance making them suitable for industrial processes.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

I claim:

1. A method for applying a multi-layer coating to a metallic substrate, comprising the steps of:

depositing a first layer of nickel onto a surface of a metallic substrate;

depositing a first layer of carbon in the form of graphene onto a surface of the first layer of nickel;

wherein the metallic substrate is coated with one or more layers of carbon in the form of graphene and one or more layers of nickel, comprising at least the first layer of nickel and at least the second layer of carbon;

drawing the coated metallic substrate through at least one mandrel, thereby altering by the application of pressure from the at least one mandrel at least a portion of at least one of the one or more layers of carbon in the form of graphene;

wherein the at least a portion of the at least one of the one or more layers of carbon in the form of graphene comprises a plurality of layers of graphene molecules, and wherein the altering of the at least a portion of the at least one layer of carbon in the form of graphene comprises reducing the thickness of at least one of the layers of graphene molecules; and eating the metallic substrate and the first layer of nickel to a temperature sufficient to crystallize the nickel and transform the nickel to a monocrystalline state, forming monocrystalline nickel, wherein the heating comprises:

heating the metallic substrate and the first layer of nickel to a first temperature within an atmosphere of argon and oxygen, forming an oxide layer on a surface of the first layer of nickel;

cooling the metallic substrate and the first layer of nickel having an oxide layer formed on the surface thereof to a second temperature;

heating the metallic substrate and the first layer of nickel having an oxide layer formed on the surface thereof to a third temperature; and cooling the metallic substrate and the first layer of nickel to a fourth temperature.

2. The method of claim 1, wherein the step of depositing the first layer of nickel onto a surface of a metallic substrate comprises electroplating the metallic substrate with nickel.

3. The method of claim 2, wherein the metallic substrate is electroplated with nickel using a solution of nickel ammonium sulfate.

4. The method of claim 3, wherein the solution of nickel ammonium sulfate comprises eight ounces of nickel ammonium sulfate per gallon of distilled water.

5. The method of claim 1, wherein the first temperature is approximately 1200° C., the second temperature is approximately 500° C., the third temperature is approximately 1463° C., and the fourth temperature is approximately 1350° C.

6. The method of claim 1, wherein the atmosphere of argon and oxygen comprises 99.5% argon and 0.5% oxygen.

7. The method of claim 1, wherein the step of depositing a first layer of carbon in the form of graphene comprises heating the metallic substrate and the first layer of nickel to a temperature within an atmosphere of methane and argon.

8. The method of claim 7, wherein the deposit temperature comprises approximately 900° C.

9. The method of claim 7, further comprising the step of cooling the metallic substrate and the first layer of nickel to a formation temperature within the atmosphere of methane and argon, for promoting the formation of graphene on the surface of the first layer of nickel.

10. The method of claim 9, wherein the formation temperature is in the range of approximately 350° C. to 250° C.

11. The method of claim 1, further comprising the steps of:

depositing a second layer of nickel onto a surface of the first layer of carbon in the form of graphene; and depositing a second layer of carbon in the form of graphene onto a surface of the second layer of nickel.

12. The method of claim 11, further comprising the step of heating the metallic substrate, the first layer of nickel, the first layer of carbon in the form of graphene, and the second layer of nickel to a temperature sufficient to crystallize the second layer of nickel and transform the second layer of nickel to a monocrystalline state, prior to depositing the second layer of carbon in the form of graphene onto the surface of the second layer of nickel.

13. The method of claim 1, wherein the at least one mandrel is heated.

14. The method of claim 1, wherein drawing the coated metallic substrate through the at least one mandrel reduces at least one dimension of the coated metallic substrate.

15. The method of claim 14, wherein drawing the coated metallic substrate through the at least one mandrel further comprises drawing the coated metallic substrate through at least a second mandrel to further reduce the at least one dimension of the coated metallic substrate.

16. The method of claim 1, wherein drawing the coated metallic substrate coated through the at least one mandrel further comprises the step of drawing the coated metallic substrate through at least a second mandrel.

17. The method of claim 1, wherein the step of altering further comprises reducing the layers of graphene molecules in the at least a portion of at least one layer of carbon in the form of graphene to form a monolayer of graphene.

* * * * *